United States Patent
Johnston et al.

[19]

[11] Patent Number: 6,116,888
[45] Date of Patent: Sep. 12, 2000

[54] PROTOTYPE MOLD FOR BLOW-MOLDING HOLLOW PLASTIC CONTAINERS AND METHOD OF MAKING SAME

[75] Inventors: Richard R. Johnston, Toledo; Theodore M. Czesak, Perrysburg; Anthony J. Scott, Maumee; Igor F. Beaufils, Holland, all of Ohio

[73] Assignee: Owens-Brockway Plastic Products Inc., Toledo, Ohio

[21] Appl. No.: 09/124,330

[22] Filed: Jul. 29, 1998

[51] Int. Cl.[7] .................... B29C 33/04; B29C 49/62; B29C 49/64

[52] U.S. Cl. .................... 425/195; 29/464; 29/557; 249/79; 249/102; 425/522; 425/526; 425/812

[58] Field of Search .................... 249/79, 102; 425/522, 425/526, 192 R, 195, 812, 183; 264/401, 219; 29/557, 464

[56] References Cited

U.S. PATENT DOCUMENTS

| | | | |
|---|---|---|---|
| 3,020,595 | 2/1962 | Szajna | 249/79 |
| 3,191,225 | 6/1965 | Polka | 425/526 |
| 3,632,249 | 1/1972 | Pearson | 425/526 |
| 3,767,747 | 10/1973 | Uhlig | 264/530 |
| 3,768,948 | 10/1973 | Horberg, Jr. et al. | 425/526 |
| 3,781,395 | 12/1973 | Uhlig | 264/530 |
| 3,978,184 | 8/1976 | Dybala et al. | 264/530 |
| 4,070,428 | 1/1978 | Krall et al. | 425/534 |
| 4,118,452 | 10/1978 | Myers et al. | 425/534 |
| 4,151,976 | 5/1979 | Schurman | 249/102 |
| 4,786,245 | 11/1988 | Windstrup et al. | 425/541 |
| 5,114,327 | 5/1992 | Williamson et al. | 425/526 |
| 5,190,715 | 3/1993 | Yamada et al. | 425/526 |
| 5,232,715 | 8/1993 | Fukai | 425/526 |
| 5,284,432 | 2/1994 | Wurzer | 425/195 |
| 5,332,384 | 7/1994 | Abramat | 425/522 |
| 5,385,466 | 1/1995 | Konefal | 425/522 |
| 5,458,825 | 10/1995 | Grolman et al. | 264/401 |
| 5,466,413 | 11/1995 | Richter et al. | 425/526 |
| 5,545,367 | 8/1996 | Bae et al. | 264/401 |
| 5,560,943 | 10/1996 | Mero et al. | 425/526 |
| 5,599,567 | 2/1997 | Gellert | 425/526 |
| 5,616,293 | 4/1997 | Ashtiani-Zarandi et al. | 264/401 |
| 5,641,448 | 6/1997 | Yeung et al. | 264/401 |

FOREIGN PATENT DOCUMENTS

| | | | |
|---|---|---|---|
| 2545133 | 6/1977 | Germany | 425/526 |
| 58-183212 | 10/1983 | Japan | 249/79 |
| 2240300 | 7/1991 | United Kingdom | 425/526 |

*Primary Examiner*—Robert Davis

[57] ABSTRACT

Improved blow-molding prototype molding system, method and apparatus wherein a plastic container is first designed using computer-aided design (CAD) software to produce a geometric computer software model of a hollow plastic container of desired contour. This model is then used to generate a geometric computer software model of a corresponding mold cavity. This data file in turn provides the control signal for a cutting tool of a CNC three axis mold machining tool operating on a starting blank for each mold half of metal material having predetermined and constant length, width and thickness outside dimensions. A mold cavity is thereby automatically machined in a front face of this blank that constitutes one of the two major and parallel face planes of the mold half block. The other half of the mold cavity is similarly formed in the front face of a second mold half block that cooperates with the first mold block to form the two mold halves of a complete blow mold. The back faces of each of the mold halves as well as the top, bottom and two opposite sides remain as initially provided in the starting blank. Standardized major mold nest fixture components cooperate in assembly to support, locate, orient and cool the associated prototype mold halves. The structure of each mold half is thus reduced to its simplest form.

12 Claims, 14 Drawing Sheets

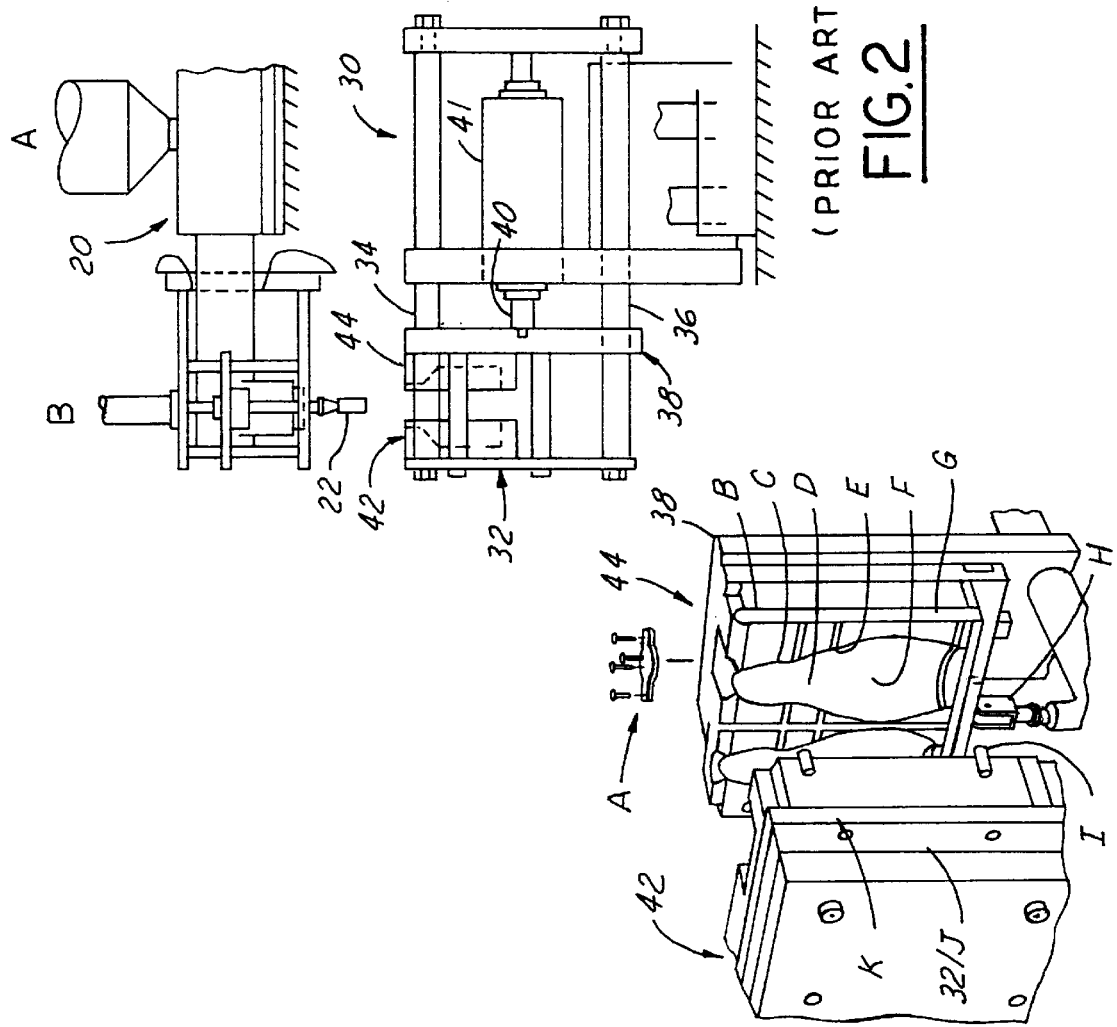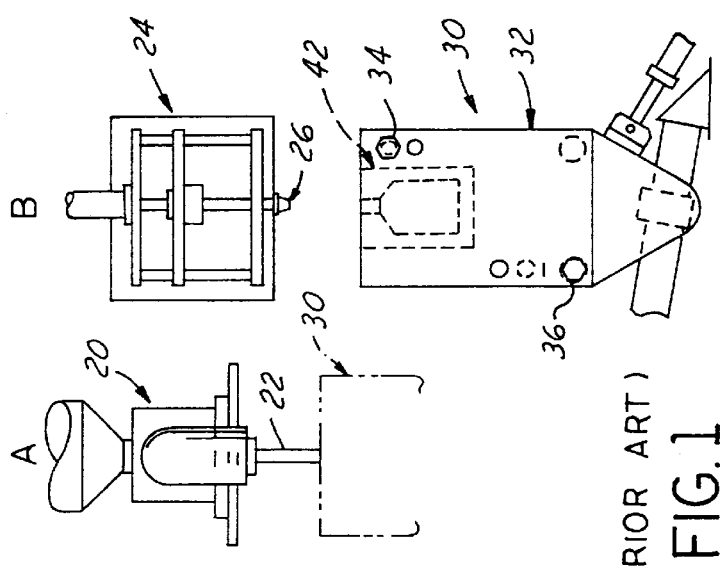

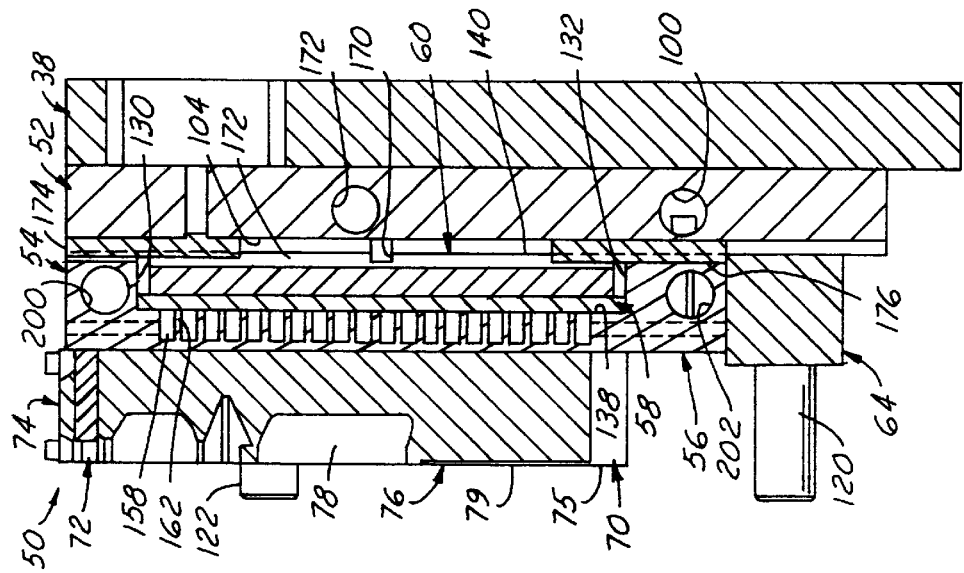
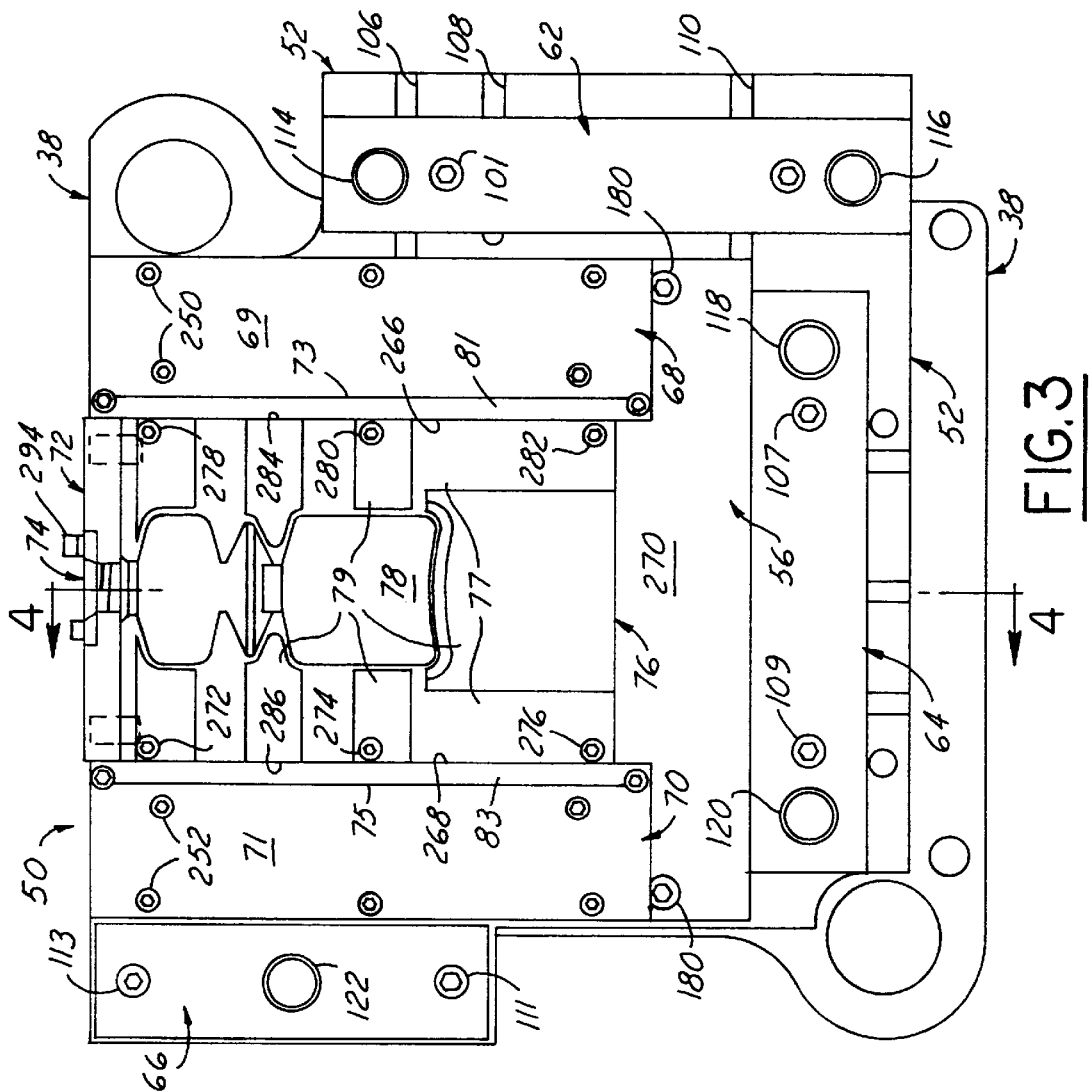

PROTOTYPE MOLD FOR BLOW-MOLDING HOLLOW PLASTIC CONTAINERS AND METHOD OF MAKING SAME

FIELD OF THE INVENTION

The present invention relates to blow-molding hollow plastic articles, particularly hollow plastic containers, and more particularly to improvements in prototype tooling for blow-molding plastic containers and methods for constructing such tooling.

BACKGROUND OF THE INVENTION

In the design and development of new plastic containers, there is often a need to produce a prototype of a part intended eventually to be mass produced by blow-molding. Containers of this type are constructed by placing a parison between two halves of a blow-mold, closing the mold, and then blowing the parison against the inside wall surface of the mold. The molds typically used in blow-molding machines for production purposes are machined from durable and long-lasting tool steel alloys, and this is a slow and expensive procedure if it is intended to produce only a few parts to test a design. For example, it is often desired to construct prototype containers for showing to customers, or for providing a limited run of containers. Although conventional prototype tooling and methods of constructing the same are much less expensive, and require less time for construction and delivery, than production tooling, nevertheless such prototype tooling still is fairly expensive and requires typically several weeks for construction and delivery.

In one type of blow-molding machine, referred to as a shuttle blow-molding machine, whether single stage or two stage (with both pre-form and final blow-mold halves), each mold half is carried on an associated platen displaceable along tie bars by a power means such as a piston and hydraulic cylinder. Examples of such shuttle type blow-molding machines are shown in U.S. Pat. Nos. 3,767,747; 3,781,395; 3,978,184; 4,070,428; and 4,118,452. The mold halves even when constructed for prototype molding purposes are typically relatively massive and complex structures fastened only at their back faces to the platen for a cantilever type mounting thereon. The mold halves themselves are built to withstand both the compressive and tensile stresses exerted during the molding operation both in the direction of mold travel as well as laterally in directions parallel to the closing plane of the mold halves. In addition, it is necessary to provide liquid cooling for each mold half and thus involves machining interior cooling channels and passageways for the cooling fluid in each mold half. Alignment pins and bushings as well as vent deflectors, are typically also built into the mold halves.

As pointed out in U.S. Pat. Nos. 5,458,825 and 5,641,448 (incorporated herein by reference), in recent years, one method for making prototype parts cheaply and quickly has been to first produce a geometric computer model of the part using computer aided design (CAD) to create a geometric computer model. A suitable CAD tool is that known as "PRO/ENGINEER". This model is then used as input to another software package called "PRO/MOLD" where the core and cavity portions of the mold are designed, and adjusted for shrink allowances of a plastic molding process. Both of these software packages are available from Parametric Technology Corporation of Waltham, Mass. USA. This produces computer models of the mold portion or portions. As set forth in the '488 patent, this computer model then may be used as the control input in a stereolithographic apparatus (SLA) as a form of solid free form fabrication. Alternatively, as pointed out in the '825 patent, the CAD model can be used to generate the control signals for computer and numerical control (CNC) paths for a cutting tool of a CNC three axis machining set up to determine the paths for the cutting tool to follow in cutting an actual single cavity prototype mold from aluminum or other metal. However, this still can be costly and time consuming if the prototype mold is designed and constructed along conventional lines for typical mold halves as mounted in a typical blow molding machine, and production conditions also are to be simulated as closely as possible to verify suitability of the prototype container design so molded.

On the other hand, if in order to save time and money for prototyping a photo-sensitive polymer or resin is to be used as the material to make the mold instead of making the mold out of metal, fewer parts can be molded and with less accuracy than a mold made of metal such as alloys of aluminum, steel, beryllium copper that are typically used for production plastic molding.

OBJECTS OF THE INVENTION

Accordingly, an object of the present invention is to provide an improved method for producing molds for use in production of prototypes or short run production in conventional blow-molding apparatus that shortens the time required from initial concept of the plastic container to be produced to actual prototype run of parts (for example, to fabricate blow molded parts in one week after approval of the article drawing generated on a computer) that is highly flexible and enables rapid changeover of various prototype molds in the same apparatus, that shortens the mold set up and take down times of the blow-molding tooling, that is applicable for blow-molding machines that utilize both a parison and pre-form, that provides for controlled liquid cooling of the mold, wherein the complexity of the container design has little or no impact on prototype mold cost or delivery time, that enables more parts to be made from a given mold for a short run production, that more closely replicates production mold tooling and such a method that is readily convertible to make long production run mold tooling.

SUMMARY OF THE INVENTION

In general, and by way of summary description and not by way of limitation, the present invention accomplishes the foregoing objects by providing an improved blow-molding prototype molding system and method wherein a plastic container is first designed using computer-aided design (CAD) software to produce a geometric computer software model of a hollow plastic container of desired contour. Then the geometric computer container software model is used to design and produce, again with suitable software, a geometric computer software model of a mold for producing the container of the desired contour. The computer data from the geometric mold software model is then transferred to a mold maker (in-house facility or outside vendor) who uses the data file comprising either the geometric cavity model ("negative") or molded model container ("positive") to generate a suitable CNC software control program for use as the control input to generate the control signals for determining computer numerical control (CNC) paths for a cutting tool of a CNC three axis mold machining tool.

The starting blank for each mold half is a simple rectangular block of metal material having predetermined and constant length, width and thickness outside dimensions.

The three axis CNC machine is then operated to machine a mold cavity in a front face of this mold half blank that constitutes one of the two major and parallel face planes of the block. The other half of the mold cavity is formed in the front face of a second mold block that cooperates with the first mold block to form the two mold halves when assembled in the mold holding carriage fixture of the blow-molding machine. The usual cavity venting channels are also machined in the front faces of the mold half blanks. However, the back faces of each of the mold halves as well as the top, bottom and two opposite sides remain as initially provided in the starting blank. Moreover, the usual venting deflector plates and standoff bulwarks or smasher plate portions are omitted from the prototype mold halves, and likewise, in some instances, also the usual alignment pins and cooperative bushings.

On the other hand, the molding machine is further provided with standardized major mold nest fixture assembly parts that cooperate in assembly to support, locate, orient and cool the associated prototype mold halves, and that in turn are supported by the stock platen of the blow-molding carriage. These major mold assembly parts include a universal backing plate that allows the set-up to mount to various types of blow-molding machines and functions as an adjustable set-up backing plate that serves as an assembly point for side rails, mold standoffs (or smasher plates) and cooling water manifold plate components of the mold assembly parts. The standoffs and/or water manifold mount to the backing plate and serve as side braces to the associated mold cavity half, and are also designed to take the brunt of the compression forces otherwise hitherto exerted by the mold closing ram on the mold halves when the two halves are clamped together and the machine operated through a molding cycle. In one embodiment, the mold assembly parts further include a mold water cooling, open-channel manifold plate that is sealed to the backside of the mold half. In all embodiments, heat transfer from the mold cavity is affected via water cooling channels that are provided in the manifold plate rather than in the mold halves. The mold manifold plate thus provides a channel for cooling fluid that is either in direct or indirect heat dissipating contact with the back face of each mold half body as operatively mounted in the nest fixture parts.

An important feature of the present invention lies in the fact that the foregoing standardized nest fixture assembly components may be re-used for differing prototype molds. That is, the outer dimensions of the prototype mold halves are of standard configuration for fitting into the fixture nest even though the dimensions and contour of mold half cavity machined in each mold half varies from one prototype mold to the next. In accordance with another important feature of the invention, the fixture manifold component has a serpentine cooling water path that conducts water flowing through this path in direct contact with either the back face of the mold part or indirect contact therewith to provide enhanced cooling of each mold half to thereby avoid complicating the mold half structure with cooling channels. The structure of each mold half is thus reduced to its simplest form, and instead most if not all the functions of water cooling, mold orientation, alignment, structural support, reinforcement against mold closing and blowing stresses, and adjustment for aligning the two mating mold halves in operation, is provided for in the standardized and re-usable major mold assembly nest parts. Thus, mold construction time is significantly reduced as well as mold machine set-up and take-down time.

BRIEF DESCRIPTION OF THE DRAWINGS

The foregoing as well as other objects, features and advantages of the present invention will become apparent from the following detailed description of the best mode presently known to the inventors of making and using the various embodiments of the invention, taken in conjunction with the appended claims and accompanying drawings wherein:

FIG. 1 is an elevational view of a portion of a conventional shuttle-type blow-molding machine of the prior art as shown in simplified form;

FIG. 2 is a fragmentary simplified side view of the blow-molding machine components as viewed from the right in FIG. 1;

FIG. 2A is a fragmentary perspective and more detailed but still simplified view of the conventional mold halves and associated backing plates and platens that are shown diagrammatically in FIGS. 1 and 2.

FIG. 3 is an elevational view of one of the prototype mold halves of the invention as mounted in the nest components of a mold tooling fixture nest also constructed in accordance with the first embodiment of the present invention shown as a subassembly by itself apart from the molding machine;

FIG. 4 is a cross sectional view taken along the line 4—4 of FIG. 3;

DETAILED DESCRIPTION OF THE PREFERRED EMBODIMENTS

Figure 5:
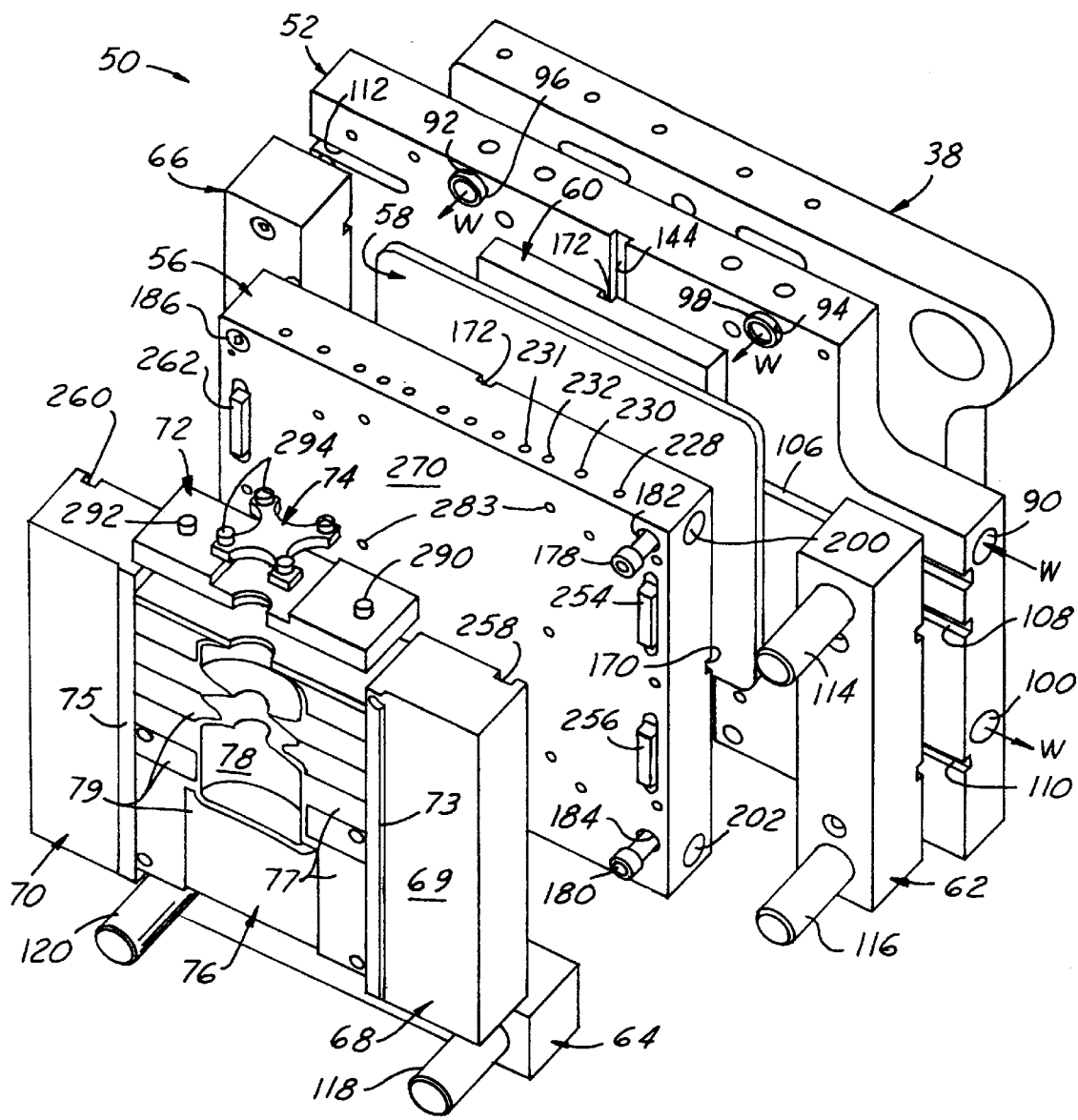
FIG. 5 is an exploded perspective view of the mold half and associated mold nest components of the mold nest subassembly of FIGS. 3 and 4.

General Arrangement of One Type of Shuttle Blow Molding Machine

FIGS. 1, 2 and 2A illustrate in simplified and diagrammatic form one half of a two shuttle set-up commonly used in one type of typical blow molding shuttle machine that generally conforms to a single cavity blow molding operation shown and described in the aforementioned U.S. Pat. No. 3,767,747, which is incorporated herein by reference. Similar apparatus set-ups are shown in the aforementioned U.S. Pat. Nos. 3,781,395 and 3,978,184, also incorporated herein by reference. The set-up includes an extruder station A having a conventional extruder 20 that provides a well-known and so-called "free-extrusion" blow molding mode of operation wherein a pendant tube of thermoplastic material issues from a downwardly facing orifice to provide the extruded tube 22 for forming a parison. The blow molding machine also includes a blow molding station B wherein a blow pin assembly 24 of conventional construction includes a blow pin 26 vertically movable into the upper entrance of closed mold halves when positioned therebelow. The machine also includes the blow mold carriage assembly 30 having a fixed outer platen 32 supported at the outer ends of a pair of tie rods 34 and 36 in the usual fashion. An inner platen 38 is slidably supported on the tie rods and is moved by the piston 40 of a ram 41 mounted on the framework of the blow mold fixture carriage assembly 30. It will be understood that another companion carriage assembly (not shown) and another blow molding station (not shown) are arrayed to the left of station A.

In accordance with conventional prior practice, the blow mold assembly fixture carriage 30 supports a blow mold in the form of cooperative blow mold subassembly halves 42 and 44 respectively mounted on platens 32 and 38 (FIG. 2). When a blow mold assembly 30 is brought into position adjacent the extruder station A, a parison-forming pendant tube 22 of heated thermoplastic material is extruded between the open set of mold halves 42 and 44. Platen 38 is moved to close mold halves 42 and 44 together on the pendant tube 22 hanging from the extrusion orifice, this closure of the mold halves thereby pinching the bottom of the tube shut to form a blowable bubble or parison.

The tube entrapped in the mold halves is then moved with the mold carriage assembly 30 laterally and vertically away from the location of the extruder 20 to an operative position at the blow station B (FIG. 1). The blow tube 26 is inserted into the portion of the parison tube protruding from closed mold halves 42, 44 and air under pressure is introduced into the palison to inflate the same to the configuration of the mold cavity defined by the closed mold halves 42, 44. During the blowing of the body of the container and during the residence time thereof in the mold, the same is being cooled, as by the provision of coolant channels provided in each of the mold halves and communicating with a liquid coolant supply circuit of the associated backing plate in the usual fashion. Thus, it will be seen that the blow mold 42, 44 of the prior art is typically constructed to be rugged, fairly complex, self-sustaining axially in the direction of mold closure to withstand the mold closure compression forces developed by operation of ram 41, as well as self-sustaining laterally in stress planes parallel to the closing plane of the mold developed during mold blowing. Hence, even when being constructed only for use as prototype tooling, the blow mold 42, 44 is relatively costly and time consuming to construct and install in the blow mold fixture carriage assembly 30 of the blow mold machine.

FIG. 2A illustrates in somewhat more detail the components of the conventional mold half subassemblies 42 and 44 in mold open condition. These components as labeled A–K in FIG. 2A are identified and their respective function outlined as set forth in the following TABLE 1:

TABLE 1

| FIG. 2A-MOLD PARTS | |
|---|---|
| A-Anvil-(striker plate) | Sits in a pocket on top of the finisher insert. A pair of platens forms the top of the finish and supports the parison as the moil is being formed. |
| B-Finish Insert | A tooled surface that determines the size and shape of the finish on the container. |
| C-Alignment Bushing | Telescopically receives associated alignment pin upon mold closure. |
| D-Pin Hole Vents | Small openings in the wall of the mold cavity. They are optional and have the same function as face vents. |
| E-Face Vents | Grooves in the mold face. They allow air to escape from the space between the parison and the walls of the mold cavity as the parison expands to form a container. |
| F-Mold Cavity | Determines the size and shape of the container. |
| G-Deflector Plate | Directs air that escapes from the mold cavity through the vents away from newly forming parisons. |
| H-Bottom Plate | Along with the pinch off area forms the base of the container by pinching the parison closed when the mold closes. It seals the bottom of the parison before the container is blown. |
| I-Alignment Pin | Telescopically engages associated alignment bushing upon mold closure |
| J-Mold Platen | Support the backing plates. Plates are part of the carriage assembly rather than of the mold assembly |
| K-Backing Plate | Supports each mold half. Water lines run through the backing plates. |

First Embodiment Prototype Mold Assembly and Method of Making Same

Referring to FIGS. 3, 4 and 5, one half of a blow mold fixture assembly 50 constructed by way of example in accordance with the method of invention is substituted for the prior art conventional blow mold half subassembly 44 and is adapted to be mounted on and carried by the platen 38 of the molding machine carriage fixture 30. The mold half tooling fixture assembly 50 is made up primarily of standardized, universally usable fixture components comprising a backing plate 52; a cooling water manifold subassembly 54 made up of a water manifold plate 56, a water manifold cover plate 58, and a water manifold support plate 60; a right side pin rail 62, a bottom side pin rail 64 and a left side pin rail 66; a right side mold standoff (or smasher plate) 68 and a left side mold standoff (or smasher plate) 70, a mold finish half 72 and an anvil 74; and a mold cavity half 76. Platen 38 is a stock item provided on any given type of blow-molding machine as the principal support member for the associated half of the blow mold assembly. The "nest" components 52–70 are of preselected standard configurations that when assembled provide water cooling manifold and coolant circuitry components as well as support for the associated prototype mold half subassembly 72–76 in a "nesting" space as defined laterally between standoffs 68 and 70 and at the rear by the front surface of water manifold 56. The associated rectangular mold half section 76 has preselected standardized outside orthogonal dimensions designed to fit this nesting space regardless of the particular configuration of the mold half cavity 78 formed in the starting block workpiece from which section 76 is machined to form cavity 78. Hence, the remainder of the fixture components 52–70 of the half mold nest can be used for different mold cavity geometries without changing the setup of the nest components 52–70 themselves relative to one another or the entire nesting assembly relative to the platen 38.

The back plate 52 is a heavy duty structural member and is provided with a predetermined pattern of tap-threaded through-holes extending with their axes perpendicular to the major planes of back plate 52 and platen 38 in assembly so that back plate 52 can be mounted to differing platens of various blow molding machines, thus rendering back plate 52 and the associated nest components universally mountable in blow molding machines equipped with differing platens in their blow mold carriage fixtures.

As best seen in FIGS. 4 and 5, back plate 52 also serves as the inlet and outlet conduit for supplying cooling water to the water cooling chamber of the manifold plate subassembly 54. To this end, a horizontally extending inlet passage 90 is drilled and bored internally to connect with two vertically extending internal branch passageways (not shown) that communicate in turn with left and right supply ports 92 and 94 that open in the front face of plate 52 near its upper edge, and which are suitably countersunk to receive sealing O-rings 96 and 98 respectively. Likewise, a main horizontal outlet passageway 100 is machined to extend horizontally of plate 52 below passageway 90 and parallel thereto to communicate with a pair of return ports (not shown) opening in the front face of plate 52, and similarly countersunk and provided with O-ring seals.

Backing plate 52 also serves as the mounting framework for the water manifold subassembly 54 (parts 56–60) as well as for the pin/bushing side and bottom rails 62, 64, 66. For this purpose, suitable fastener-body receiving openings are provided in the rails for registry with the corresponding openings in the front face of plate 52 to provide for removable attachment of these nest components by socket head cap screws 101, 103, 107, 109, 111 and 113 to the front face of the backing plate 52 (FIG. 3). A series of vertical and horizontal keyways, such as keyways 104, 106, 108, 110 and 112 (FIG. 5) are provided to receive precision locating alignment key stock therein to both reinforce the attachment mounting of these components to backing plate 52 as well as to insure precision location of the components thereon.

The rails 62, 64 and 66 carry cantilevered mounted, telescopically engageable protruding, alignment members, either in the form of pins or pin-receiving bushings. In the embodiment illustrated by way of example in FIGS. 3–5, these alignment members are shown as alignment pins 114 and 116 on right side rail 62, alignment pins 118 and 120 on bottom rail 64, and on left side rail 66, one alignment pin 122 (FIG. 3). It is to be understood that FIG. 5 illustrates only one half of a complete first embodiment mold fixture assembly, the other half (not shown) being a mirror image of what is shown in FIG. 5. The half mold fixture assembly 50 would take the place of the prior mold half cavity subassembly 44 of FIGS. 1, 2 and 2A for mounting to the rear platen 38 of the carriage fixture 30. In this example, this mirror image mold nest assembly (not shown) would have its side and bottom rails equipped with cooperative alignment bushings that are oriented to telescopically receive the associated alignment pins 114–22 of assembly 50 that protrudes from the side and bottom rails 62, 64, 66 when platen 38 is moved to mold closed position. The telescopically interengaged pins and bushings thus insure precise alignment of the mold cavity halves of each nest in the mold closed condition, and can be easily adjusted without altering the set-up of mold section 74 in its nest The water manifold subassembly 54 (shown in cross section in FIG. 4) is made up of the water manifold plate 56, cover plate 58 and backing plate 60, these three parts being shown exploded from one another in FIG. 5 and the water manifold plate 56 being shown by itself in FIGS. 6 and 7. As best seen in comparing FIGS. 4 and 6, the back side of water manifold plate 56 is provided with a large rectangular cavity defined by top and bottom walls 130 and 132 and side walls 134 and 136 and a recessed planar surface 138 inset from the rear marginal face 140 of plate 56 slightly over half the thickness of the plate (FIG. 4). Three vertically arrayed side-by-side water channel serpentine passageways 150, 152, 154 are formed by milling into recessed surface 138 serpentine grooves 156, 158, 160, respectively, leaving alternating left and right projecting cooling fins oriented parallel to one another and spaced vertically apart in each serpentine row, as illustrated by the fins numbered 162 and 164 in row 150 in FIG. 6.

Figure 7:
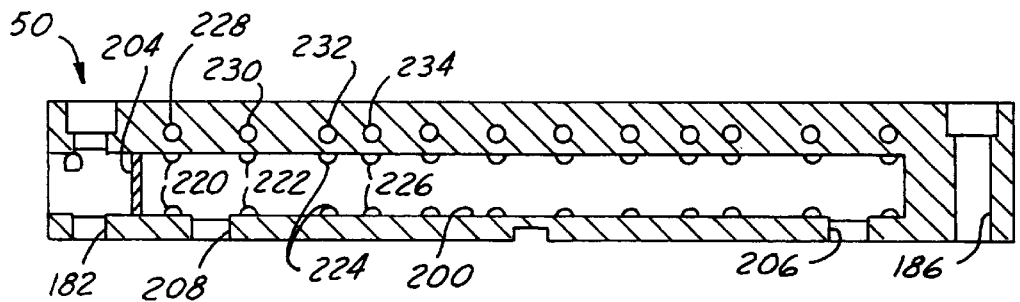
FIG. 7 is a cross sectional view taken along the line 7—7 of FIG. 6.
Figure 6:
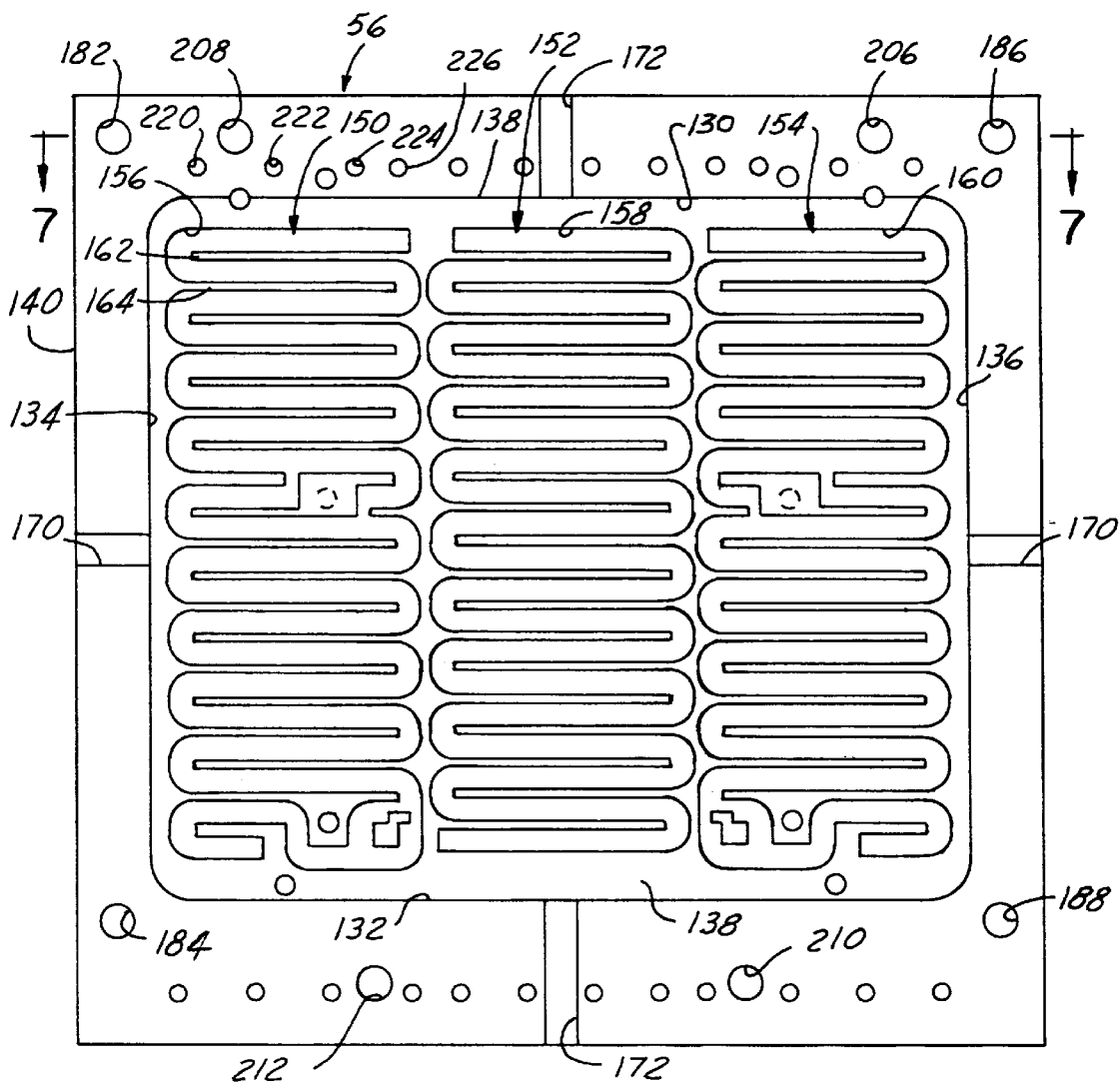
FIG. 6 is an elevational view of the cooling water manifold component of the nest fixture components of FIGS. 3–5 shown from the rear side with the cover plate and associated support plate removed.

As shown in FIG. 4, the water manifold channel grooves 150, 152, 154 are closed on their back side by cover plate 58 that fits closely within the confines of the recess walls 130–136 and flat against surface 138. A continuous peripheral weld 168 secures cover plate 58 in manifold plate 56 and is made to water-tight specifications. Support plate 60 is tack welded to the back side of cover plate 58 prior to assembly to manifold plate 56. After the subassembly of support plate 60 and cover plate 58 has been welded in place, a central horizontal keyway groove 170 (FIG. 4) and an intersecting central vertical keyway groove 172 are milled in the back side of support plate 58, and continuations of the ends of each of these grooves are likewise milled in the back face of manifold plate 56. Suitable keys 174 and 176 register in backing plate keyway 104 and support manifold plate keyway 172 for precision lateral positioning of these two components relative to one another. The water manifold subassembly 54 is detachably fastened to the front face of backing plate 52 by four socket head cap screws, such as cap screws 178 and 180 (FIG. 5) individually inserted through one of the associated four corner mounting holes 182, 184, 186, 188 (FIGS. 5, 6 and 7).

The passageways for admitting liquid coolant to the serpentine cooling groove arrays 150, 152 and 154 and for exhausting coolant fluid therefrom are formed by drilling horizontal blind bores 200 and 202 in the top and bottom solid margins of manifold plate 56. Each of these bores is then sealed closed by a plug disk seal disposed interiorly of but adjacent the associated cap screw mounting holes 182 and 184 (disk seal 204 for bore 200 being shown in FIG. 7). Coolant fluid is admitted to the upper cross channel bore 200 via entrance ports 206 and 208 that respectively register with backing plate supply ports 92 and 94 when manifold subassembly 54 is assembled to plate 52 as described previously. Water is exhausted from bottom blind bore 202 via exhaust passages 210 and 212 that register with associated return ports in the front face of backing plate 52 that in turn communicate with backing plate coolant return bore 100.

Four right angle connecting passageways are provided to feed cooling water from bore 200 to the top groove of each manifold serpentine array 150, 152 and 154. More particularly, and as seen in FIG. 6, four horizontal blind bores 220, 222, 224 and 226 are drilled into the back face of manifold plate 56 so as to intersect both sides of the lower reach of bore 200. Bores 220–226 then perpendicularly intersect at their inner ends corresponding vertical drilled passages 228, 230, 232 and 234 that are drilled downwardly from the top edge surface of plate 56 and open into the uppermost leg 156 of serpentine passageway 150 to thereby feed inlet cooling water into serpentine passageway 150 at the upper end thereof. The entrance ends of bores 220–226 are plugged where they intersect the rear face 140 of manifold plate 156, and likewise the ends of passageways 228–234 are plugged where they intersect the upper edge surface of plate 56. As will be seen from FIGS. 6 and 7, the central serpentine groove passageway 152 likewise is fed by four right angle passageways, and likewise as to the right-hand serpentine groove passageway 154.

The lowermost excursion legs of serpentine groove passageways 150, 152 and 154 are similarly communicated to drain channel bore 202 by four right angle connecting passageways for each of the three passageways.

The right and left mold standoffs 68 and 70 are individually fastened by associated set of five cap screws 250 and 252 (FIG. 3) that individually thread into associated tapped mounting holes provided in the front face of manifold plate 56. Precision lateral alignment of each standoff 68, 70 with its mounting position on manifold 56 is assured by a pair of keys 254 and 256 secured by fasteners in keyway slots provided therefor in the front surface of manifold plate 56. Keys 254 and 256 register with a keyway 258 provided in the back side of standoff 68 (FIG. 5). Left standoff 70 likewise has a keyway groove 260 for receiving a left hand pair of keys fastened in keyway slots in the front face of plate 56, only upper key 262 being visible in FIG. 5.

With the standoffs 68 and 70 so mounted, the mutually facing side surfaces 266 and 268 of standoffs 68 and 70 respectively, in cooperation with the planar front surface 270 of manifold plate 56, are designed to form precision side flanking and rear abutment surfaces to define a "nest" of predetermined width and depth dimensions for precision-fit receiving the mold cavity half 76. The back side of mold half block 76 is flat and planar (FIG. 4) and abuts surface 270 in flat face-to-face contact and is drawn tight thereagainst by six cap screws 272–282 (FIG. 3) threaded into six associated tapped mounting holes 283 provided in the front face of manifold plate 56. The parallel side surfaces 284, 286 of block 76 seat snugly against standoff side surfaces 266 and 268 respectively in assembly therewith on manifold plate 56.

It is to be noted that the respective front "smasher plate" faces 69 and 71 of standoffs 68 and 70 are recessed relative to respective associated integral standoff rib portions 73 and 75 of standoffs 68 and 70. Rib portions 73 and 75 provide continuations of associated standoff side surfaces 266 and 268 that terminate flush with the plane of the outermost face surfaces 77 of block 76. The usual mold cavity venting grooves 79 are recessed rearwardly from face surfaces 77 and thus rib portions 73 and 75 serve as deflectors in place of the built-in mold cavity deflector plates of the prior art conventional mold halves 42 and 44 referenced in FIG. 2A.

Standoff rib portions 73 and 75 also are precision machined to provide flat abutment surfaces 81 and 83 that cooperate upon mold closure with corresponding standoff rib portions provided in like manner on the companion mirror-image mold nest fixture assembly (not shown) that mounts on outer platen 32. Hence, the mold-closing compression forces exerted by ram 41 during complete mold closure are taken as reaction compressive stress (in the direction of mold travel) by standoffs 68 and 70 rather than by the material of mold block 76.

The mold finish 72 is secured by two socket head cap screws 290 and 292 that thread into the upper surface of block 76. Anvil part 74 is fastened by four cap screws 294 that thread into mounting holes in the recess provided for anvil 74 in the upper surface of finish mold sections 72. It is to be understood that the finish mold section 72 and associated anvil 74 is often re-usable in conjunction with containers of differing contour, and hence may not need to be specially made for each prototype mold.

It will thus be seen that, in accordance with the invention, the outer dimensions of any given half mold block 76 are maintained constant and adapted to precision fit between the standoffs 68 and 70. Accordingly, such prototype mold halves may each have a different mold half cavity 78 formed therein as desired for molding a given prototype container shape without thereby requiring any change in the structural supporting and cooling components 52–74 of the mold nest assembly 50, nor in their set-up adjustment in assembly to their associated blow molding machine platen. The nest components 52–74 may thus be reused for differing prototype molds 76 because the outer dimensions of each prototype mold 76 are a standard configuration for fitting into the standard-sized nest provided by standoffs 68 and 70 and the associated front face 270 of manifold plate 56.

Second Embodiment Half Mold and Nest Assembly

Figure 8:
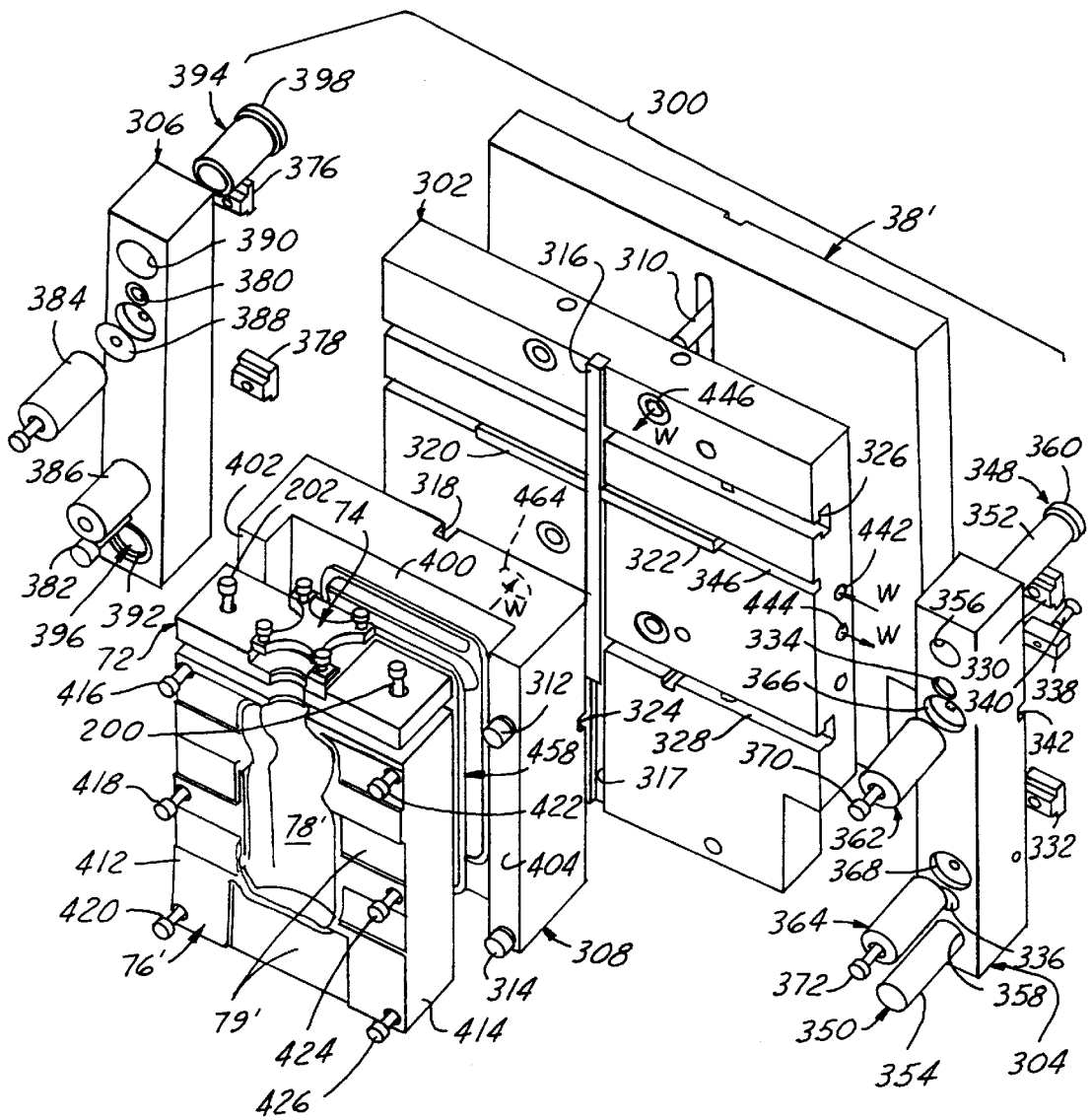
FIG. 8 is an exploded perspective view of a second embodiment of a mold nest fixture assembly and associated prototype mold half subassembly also constructed in accordance with the present invention.
Figure 10:
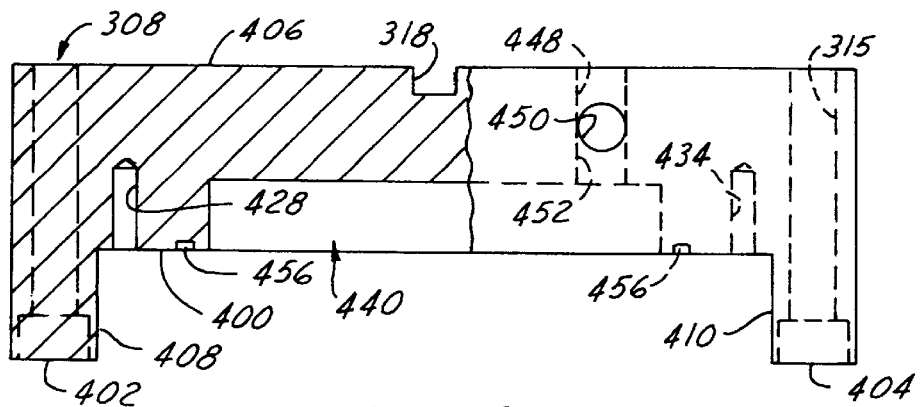
FIG. 10 is a cross sectional view taken along the line 10—10 in FIG. 9.
Figure 9:
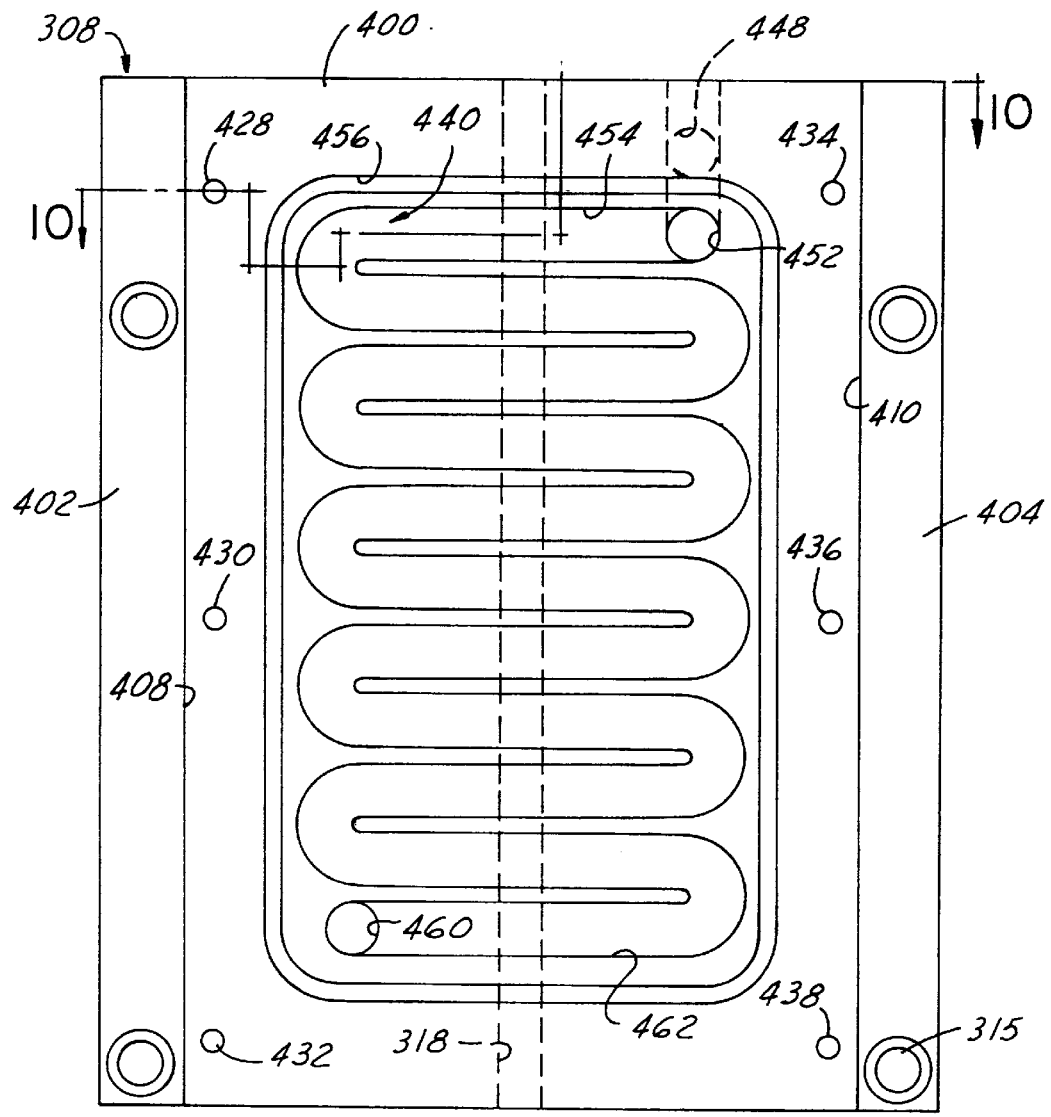
FIG. 9 is an elevational view of a second embodiment of a cooling water manifold that is a component of the second embodiment fixture assembly of FIG. 8, but shown by itself.

FIGS. 8, 9 and 10 illustrate a second embodiment of a half mold and nest assembly 300 also constructed in accordance with the method and apparatus features of the invention. Assembly 300 includes as its principal components a stock platen 38' which may be constructed similar to platen 38 described previously, or alternatively that may be constructed in the form of a universal backing plate as shown and to incorporate a fastening system that enables mounting to various blow molding machines. Assembly 300 also includes a backing plate 302 that serves as the assembly point to the universal backing plate 38' for further assembly of next fixture components comprising a pin side rail 304, a bushing side rail 306 and a mold cooling water manifold plate 308. The remaining assembly components comprise the mold finish half plate 72, associated anvil 74 and a modified mold cavity half block or plate 76' corresponding to mold cavity half 76 described previously. Backing plate 302 detachably mounts to plate 38' by means of a plurality of socket head cap screws, one of such screws 310 being seen in FIG. 8. Mold manifold plate 308 is detachably secured to backing plate 302 by four cap screws, two of such cap screws 312, 314 being seen in FIG. 8. Accurate horizontal alignment of manifold plate 308 on backing plate 302 is assured by a vertical key 316 mounted in an associated keyway 317 in plate 302 and that is received in a companion keyway 318 in block 308. Vertical alignment is provided by horizontal keys 320 and 322 mounted in backing plate keyway 346 and received in a horizontal keyway 324 provided in the back side of block 308.

Pin side rail 304 mounts to plate 302 adjacent the right side of block 308 by a clamp-type system comprising a pair of horizontal dovetail grooves 326 and 328 in plate 302 that slidably receive corresponding dovetail keys 330 and 332 in turn attached by cap screws 334 and 336 to pin rail 304. An alignment key 338 is secured by screw 340 to a keyway 342 in the back side of pin rail 304 so as to slidably mate in the keyway 346 of plate 302. Pin rail 304 also includes a pair of alignment pins 348 and 350 each having a shank 352 and 354 which are inserted through corresponding through-bores 356 and 358 in pin rail 304. Pins 348 and 350 are captured in the associated rail by the head 360 of each pin seating between a counterbore in the rear end of bore 356, 358 and the front face of plate 302 in the mounted condition of pin rail 304 on plate 302.

Pin rail 304 also carries a pair of standoff abutment rods 362 and 364 cantilevered mounted in sockets 366 and 368 in the front face of rail 304 by associated cap screws 370 and 372 extending coaxially through the respective rails.

Bushing side rail 306 is similarly mounted to plate 302 by a pair of dovetail keys 376 and 378 received in grooves 326 and 328, respectively, and attached by cap screws 380 and 382 to rail 306. Rail 306 also carries a pair of standoff rods 384 and 386 mounted thereto in the manner of rods 362 and 364. The end face protrusion (abutment plane) distance of each standoff rod 362, 364, 384, 386 is precision adjusted by use of suitable shims 388. Bushing rail 306 has a pair of larger diameter through-bores 390 and 392 that individually receive hollow alignment bushings 394 and 396. The head flange 398 of each of these bushings is likewise captured between a counterbore in each of the bores 390 and 392 (not shown) and the front face of plate 302 in the mounted condition of rail 306.

It will be understood that the other companion mirror-image mold nest assembly carried on the opposed platen of the carriage fixture of the molding machine, and that cooperates with assembly 300 in forming the complete mold system, is set up with its pin rail and bushing rail coaxially aligned with pin rail 304 and bushing rail 306 so that the pin shanks 352 and 354 are slidably received in the corresponding bushings of the other mirror image mold nest during mold closure. Similarly, the standoff rods 362, 364, 384 and 386 are coaxially aligned with similar standoff rods on the mirror image cooperative mold half nest assembly to control abutment closure position of the two mold halves, and to absorb as compression reaction stresses most of the mold-closing forces, in the closed condition of the complete mold assembly on the molding machine carriage.

Mold cooling water manifold plate 308 has a recessed nest or pocket formed in its front face by a planar back surface 400 recessed rearward from the flanking front end faces 402 and 404 of block 308 and extending in a plane parallel to the back face 406 of block 308 (FIGS. 8, 9 and 10). The sides of the pocket recess in block 308 are defined by parallel sidewalls 408 and 410 that are spaced from one another by a constant predetermined design distance. The mold cavity half block 76' likewise has a predetermined set of outside dimensions such that its parallel sidewalls 412 and 414 have a constant predetermined spacing widthwise of block 76' so as to fit with a precision snug sliding fit in the pocket of block 308 and against the pocket sidewalls 408 and 410, respectively. The flat back wall (not shown) of mold block 76' abuts flat against the recess surface 400 of the pocket when it is drawn tightly thereagainst by tightening down the mold block mounting cap screws 416–426 that are threadably received in associated tapped mounting holes 428–438 (FIGS. 9 and 10) provided in face 400 of the pocket. Manifold block 308 thus supports the mold cavity block 76' and also, like standoffs 68 and 70, reinforces it laterally to help resist forces exerted on the mold cavity walls during parison blow in the molding cycle.

The cooling of the mold cavity, after blowing the hot parison therein, is accomplished by providing a liquid coolant circulating passageway system with inlet and outlet supply passages in the backing plate 302 feeding a serpentine coolant passageway 440 formed as a further recess of constant depth in recessed pocket surface 400 (FIG. 10) and following the serpentine path as shown in elevation in FIG. 9. Coolant supply lines are connected to associated ports 442 and 444 provided in the side of backing plate 302 that feed backing plate internal passages (not shown) so as to supply water out of an O-ring sealed port 446 (FIG. 8) into an inlet port 448 (FIGS. 9 and 10) in the back face 406 of block 308. Port 448 is connected by a vertical passage 450 to an inlet port 452 feeding into the upper entrance leg 454 of passageway 440. A circumferentially continuous O-ring groove 456 is milled in face 400 so as to completely encompass the serpentine passageway 440 (FIG. 9) and receives an 0-ring 458 (FIG. 8) that seals the back face of block 76' when clamped thereagainst in assembly to serve as a cover to close the open face of passageway 440. Hence, coolant flows directly against the back surface of block 76' as it makes its excursion through passage 440 from inlet 452 to an outlet 460 at the end of the bottom-most leg 462 of passageway 440. Outlet 460 registers with a port 464 in the front face of plate 302 (FIG. 8) which communicates with internal passageways therein to exit at port 444.

Method of Producing Prototype Mold Assemblies 50 and 300 and Mode of Operation of Same With the foregoing description of the structure and function of the components 52–74 and 302–308 of each respective half mold assembly nest 50 and 300 and associated half mold cavity blocks 76 and 76' in mind, it will now be better understood how the improved blow-molding prototype molding system and method of the invention shortens the time from initial concept of the plastic container to be produced to actual prototype run of parts. In accordance with the invention, a plastic container is first designed as desired using computer-aided design (CAD) to produce a geometric electronically-recorded computer model of a hollow plastic container of desired contour. This is accomplished using the aforementioned conventional software programs. If desired, this can be transferred into a plastic mock-up of the container using one or more of the aforementioned prior art rapid prototyping systems. However, typically the computer terminal orthogonal and three-dimensional rotatable graphic display is adequate to verify to the container designer that the program has produced the proper computer model of a container of desired contour. The geometric computer container model is then used (either as a positive computer container image directly, or indirectly via a negative computer cavity image) to design and produce, with suitable software, a geometric computer model of a mold cavity 78, 78' to be machined in the starting blank block that is to be employed to produce the mold half cavity block 76, 76' for blow molding the container of the desired contour. This computer data for generating the geometric mold cavity model is then transferred to a mold making facility (either on computer diskette or via direct on-line hook-up) that uses this data file, comprising the geometric computer container model or mold cavity model, as the control input data to be converted into a CNC software control program that in turn is used to generate the control signals for determining the computer numerical control (CNC) paths for a cutting tool of a conventional CNC three axis mold machining tool to machine the half mold cavity.

As will be evident from FIGS. 3–5 and 8, the starting blank for each mold half 76, 76' is a simple rectangular block of metal material, such as a suitable alloy of aluminum, steel, or beryllium copper, etc., having a predetermined length, width and thickness outside dimensions. The width dimension conforms to the spacing between the flanking side surfaces 266 and 268 of the right and left side wall standoffs 68 and 70, respectively, or between the surfaces of the sidewalls 408 and 410 of the nest recess pocket of mold water manifold plate 308.

The CNC machine thus is automatically controlled to machine the mold cavity 78 or 78' in the front face in this mold half blank, this front face constituting one of the two major and parallel face planes of the starting block. The other half of the mold cavity is formed in the front face of a second mold starting block that is intended to cooperate with the first mold block to form the two mold halves when assembled in the associated nest assemblies 50 or 300 and installed on the opposed platens of the carriage fixture 30 of the blow molding machine as described, for example, in conjunction with FIGS. 1 and 2. It is to be noted that the back faces of each of the molds halves 76, 76', as well as the top and bottom and two opposite sides thereof, remain as initially provided in the starting blank. The only further machining required to produce the finished mold half blocks is the front face vent recesses 79, 79', the holes for the cap screw fasteners 272–282 or 416–426, as well as those for mounting the finish plate 72 with cap screws 290, 292.

In accordance with the method, the molding machine is provided, in place of the conventional prior art mold set-ups 42 and 44 of FIGS. 1–2A, with the major mold assembly components 52–74 of the nest assembly 50 of the first embodiment or components 302–308, 72, 74 of the next assembly 300 of the second embodiment. The nest fixture components cooperate in assembly as a fixture support for the prototype mold half cavity part 76, 76' when supported as an assembly by the stock platens 32 and 38 of the blow molding carriage 30. These major mold assembly parts thus include the universal backing plates 52, 302 that allow the set-up to mount to various types of blow molding machines. This adjustable set-up backing plate, on its front side, serves as an assembly point for side rails 62 and 66, bottom rails 64 in assembly 50, and for pin and bushing rails 304 and 306 in assembly 300. The backing plates also serve as an assembly point and support for the manifold plate components 56, 308, as well as, in the first embodiment, right and left standoffs 68 and 70. Standoffs 68 and 70 in assembly 50 and water manifold 308 in assembly 300 securely mounted to the associated back-up components of the nest assembly and serve to side brace the associated mold cavity halves 76, 76'. Hence, these nest components are designed to take the brunt of lateral expansion forces exerted on the mold half when the two halves are clamped together in the molding machine and operated through a molding cycle wherein the mold cavity is subjected to the blow molding fluid pressure. Moreover, the right and left standoffs 68 and 70 in assembly 50 and the standoff rods 362, 364 and 384, 386 in assembly 300 are designed to absorb the brunt of the mold closing compression forces exerted by ram 41 in the direction of mold travel when the two halves are clamped together in the closing of the mold fixtures for operation in a molding cycle. The alignment pins 114–122 or 348, 350 and associated bushings are also securely and accurately oriented on the adjustable backing plate, separate from the mold cavity halves, rather than being built into the mold cavity halves as in the prior art mold assemblies described in conjunction with FIGS. 1–2A. The deflector plates in the first embodiment assembly 50 are also built in to the right and left standoffs 68 and 70 and thus are no longer required to be made as a component of the mold cavity half part.

In addition, it is to be noted that the mold cavity half block also is devoid of any water cooling channels, the mold cooling function having been transferred to the mold manifold plates 56 in assembly 50 and to manifold plate 308 in assembly 300. In assembly 300, the mold manifold plate 308 has open serpentine water conducting channels that are sealed by the back side of mold half 76', whereas manifold plate 56 is a sealed unit in assembly with backing plate 52 and thus function as a coolant carrier independently of mold cavity half 76. In both cases, the water manifold plate 56, 308 provides heat transfer from the mold cavity through the metal of the half mold cavity block to the water cooling channels that are provided in the manifold plates 56, 308 rather than in the mold cavity half parts. The backing plate is provided with supply and return passageways for the coolant fluid that communicates in assembly with the manifold plates, if it is desired to remain in keeping with the conventional use of the backing plate to provide the hook-up to the water lines for cooling the mold halves.

In the first and second embodiment assemblies 50 and 300, the mold cavity half consists two parts: (1) main body part 76, 76' of the mold half having the aforementioned predetermined outside dimensions in a rectangular starting block; and (2) a finish mold section 72 (with its associated anvil 74) affixed to the top side of the mold body block. Preferably, the mold maker provides the main body part for the two mold halves, whereas the finish mold section 72 is often reused by the molder in conjunction with containers of differing contour. In some instances, each mold half will also be sub-divided further so that it is made in three parts, i.e., by having a heel mold section designed to flush abut the bottom side of the body block rather than being integrated as shown in conjunction with half mold cavity block 76, 76'. In this alternative construction, the mold maker would also provide the heel section because it includes a portion of the mold cavity design to be CNC machined, and typically varies with each variation in contour body shape.

It will thus be seen that an important feature of the present invention lies in the fact that the prototype molding system provides standardized elements in the molding machine fixture that may be reused for differing prototype molds. That is, the outer dimensions of the prototype mold halves 76, 76' are of standard configuration for fitting into the standardized nest set-up provided by the remaining components of the fixture even though the dimensions and contour of the mold cavity 78, 78' varies from one prototype mold to the next. Moreover, the construction of the mold cavity half blocks is simplified by divorcing from the mold cavity half block the structure of the prior art that serves to align the two mold halves, that serves as mold standoffs to absorb closing forces in compression in the direction of mold closing travel, that serves to cool the mold cavity half parts, to align the mold halves when closed together and to deflect mold venting gasses. This feature enables the structure of each mold half to be reduced to its simplest form, and to transfer all the functions of cooling, orientation, alignment, static structural support, reinforcement against dynamic and static molding stresses, and adjustment for aligning the two mating mold halves in operation to the major mold assembly nest parts. These components can then in turn be better optimized to perform their respective functions without being design comprised by the necessity of integration into the mold cavity half block. This features also enables the prototype mold construction time to be significantly reduced, and also reduces the time required for molding machine set-up and take-down. Also, due to the simplification of the mold cavity half parts 76, 76', the same can be machined from more durable material even though only designed for prototype or short pilot run production without thereby increasing the overall expense, and yet making it possible to run the same in production for relatively longer but not extensive production runs. On the other hand, removing the mold-closing compressive stresses from the mold cavity half blocks, and reinforcing the same laterally, enables the prototype molds to be made of weaker materials, if desired, such as those that are more readily adaptable for being made by using conventional rapid prototyping systems.

Third Embodiment Water Manifold and Associated Half Mold Nest Assembly

Figure 18:
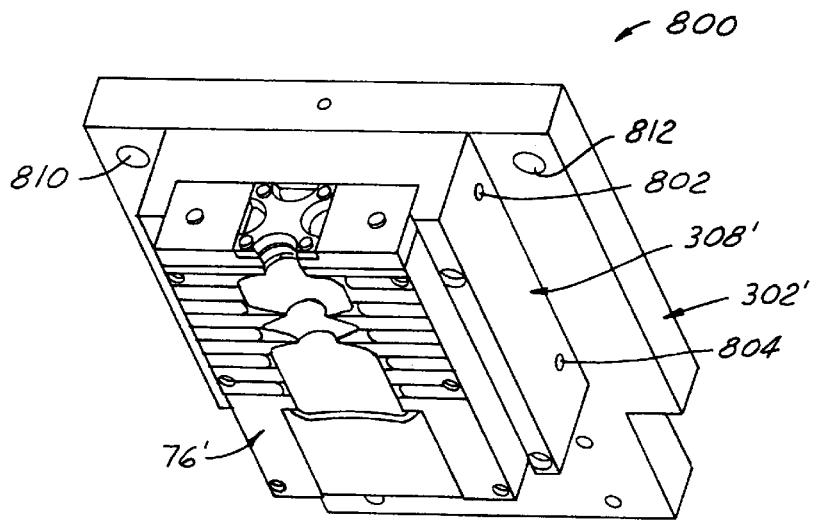
FIG. 18 is a perspective assembly view of a fourth embodiment of a mold nest fixture assembly of the invention which is similar to but a modification of the second embodiment fixture assembly of FIGS. 8–10.
Figure 19:
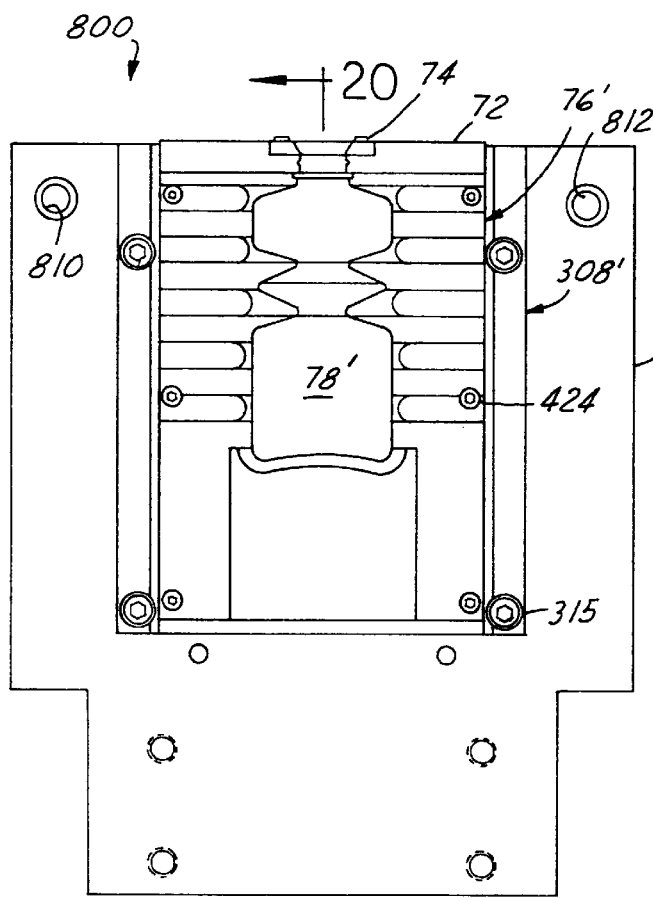
FIG. 19 is a front elevational view of the fixture assembly of FIG. 18.
Figure 20:
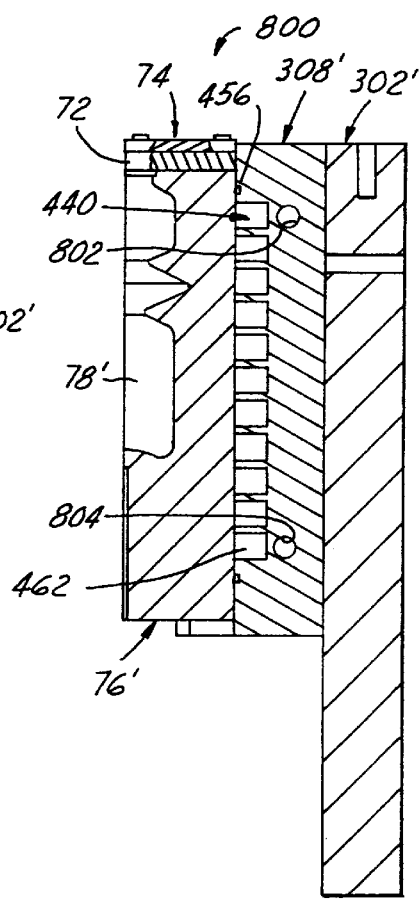
FIG. 20 is a cross sectional view taken on the line 20—20 of FIG. 19.
Figure 21:
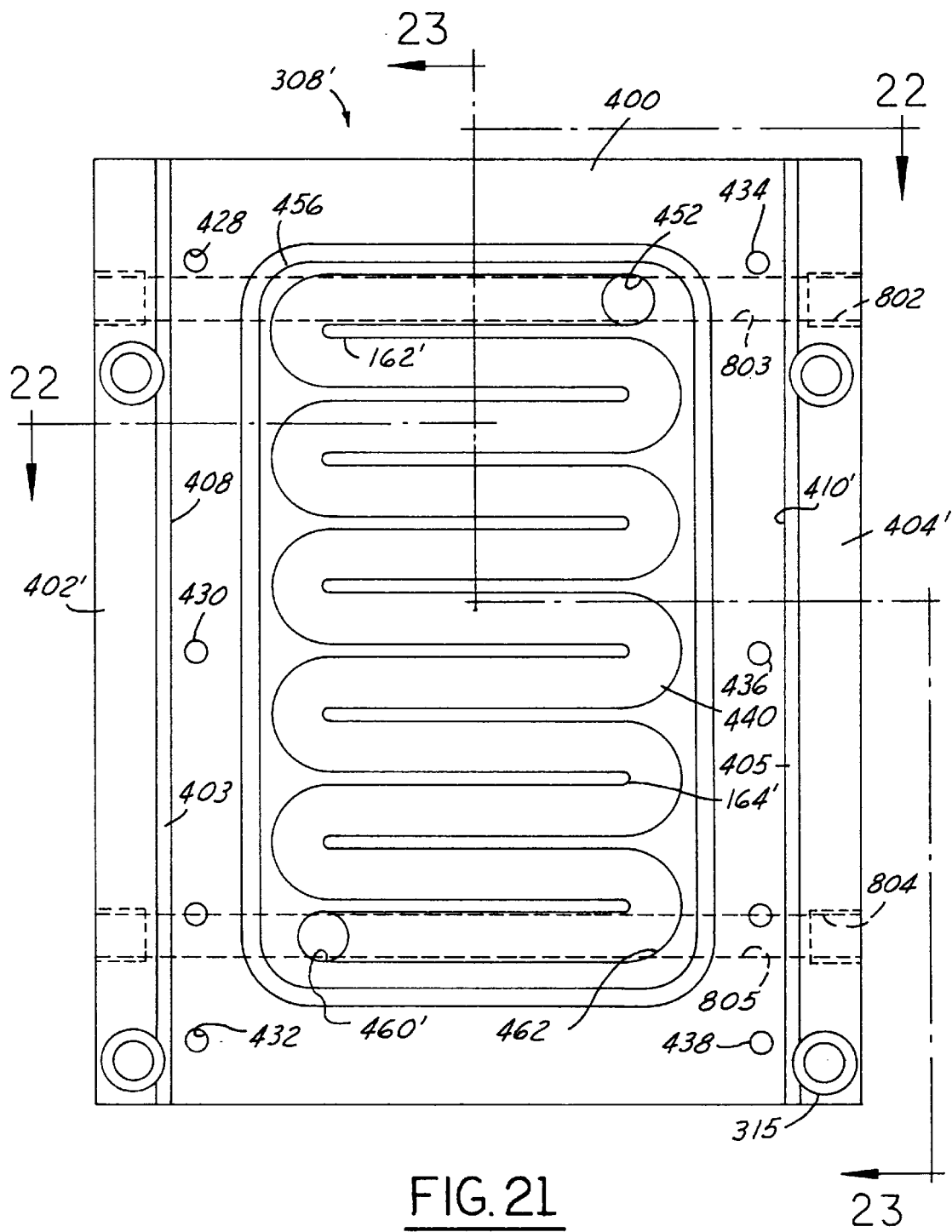
FIG. 21 is a front elevational view of the modified water manifold nest plate employed in the fourth embodiment mold nest fixture assembly of FIGS. 18–20.
Figure 22:
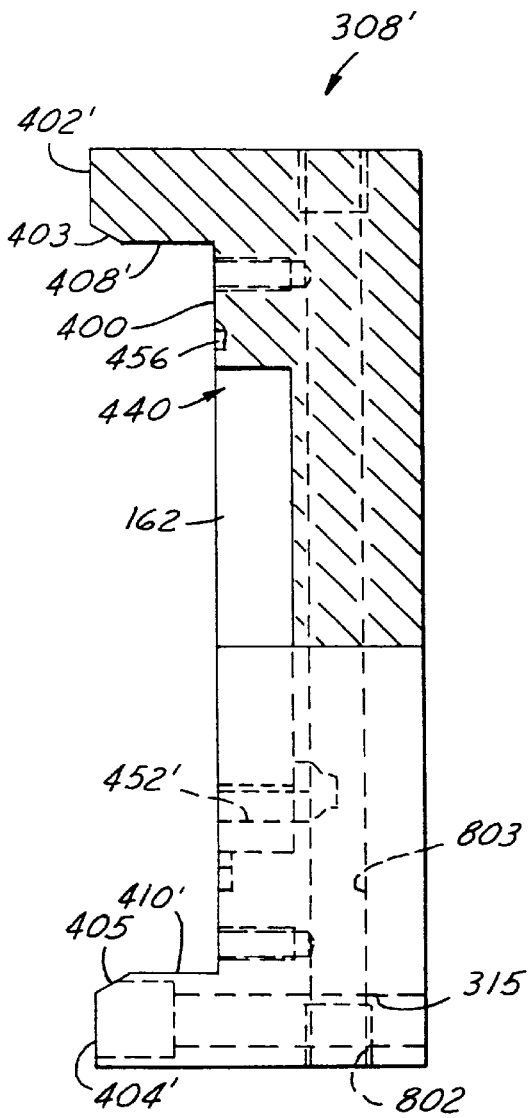
FIGS. 22 and 23 are cross sectional views taken respectively on the lines 22—22 and 23—23 of FIG. 21.
Figure 23:
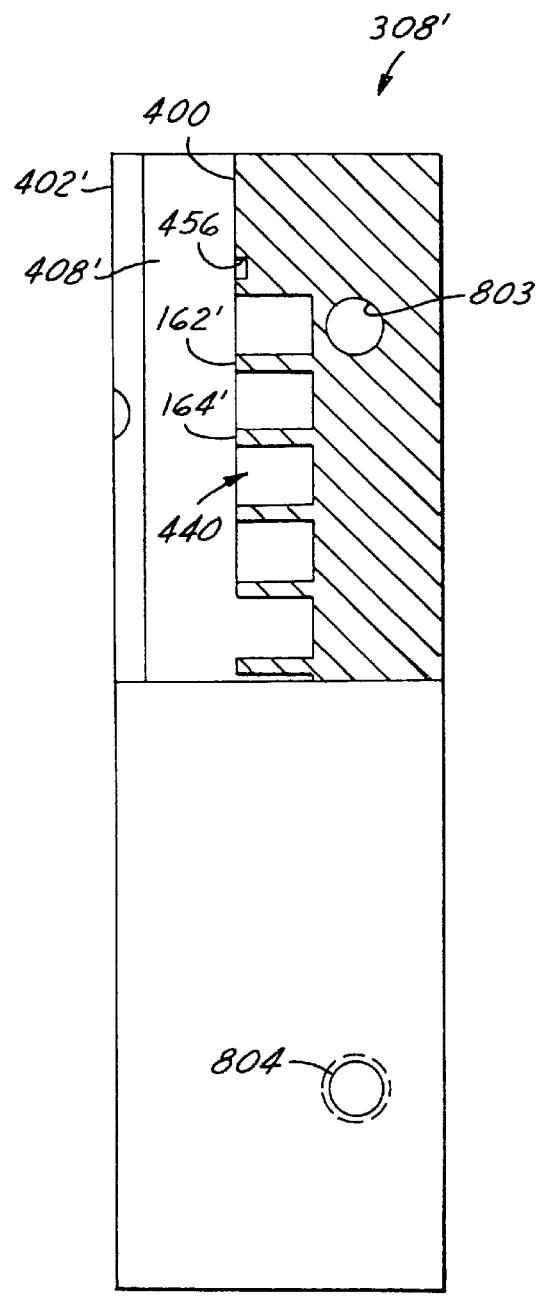

FIGS. 11, 12, 13, 14 and 15 illustrate a third embodiment of a water manifold sub-assembly that may be substituted for the water manifold plate sub-assembly 308 in the second embodiment half mold and nest assembly 300, or in a modified fourth embodiment half mold and nest assembly as indicated hereinafter with reference to FIGS. 18–20 of the drawings. The third embodiment mold cooling water manifold plate 500 is somewhat similar to water manifold plate 308 of the second embodiment in having a recessed nest or pocket formed in its front face by a planar back surface 502 recessed rearward from the flanking front end faces 504 and 506 of plate 500, all of which extend in a plane parallel to the back face 508 of manifold plate 500 (FIGS. 11–13 and 15). The sides of the pocket recess in plate 500 are defined by parallel side walls 510 and 512 that are spaced from one another by a constant predetermined design distance to receive with a clearance fit a mating mold cavity half block 76, 76' or the like in the pocket of manifold plate 500 and against the pocket side walls 510 and 512 respectively. Again, the flat back wall of the mating mold cavity half block will abut flat against the recessed back wall surface 502 of the pocket when it is drawn tightly thereagainst by tightening down the mold block mounting cap screws that are threadably received in the associated cooling block through-holes 514, 516, 518, 520 (FIGS. 11–13 and 15) and thereby precision align the mold block to the cooling block.

Water cooling manifold plate 500 differs from water manifolds 56 and 308 in several respects. As a first differential feature, manifold plate 500 is constructed such that the coolant supply and return lines are connected directly into the water manifold 500 rather than traveling from the back plate 52 or 302 into the cooling passageways of the water manifold. This feature eliminates the need for coolant supply passages in these back plates, and even, in some applications, the need for these back plates altogether.

Secondly, the front faces 504 and 506 of plate 500 function as mold standoff abutment surfaces. This feature thus eliminates the need for rails 304 and 306 and associated standoff rods 362, 364, 384 and 386, or separate plates 68 and 70 that are provided with the standoff abutment vent deflector ribs 73 and 75.

Thirdly, these "wide wing" portions of the plate also mount four pairs of cooperative alignment pins and bushings that interengage to produce alignment of the two cooperative mold cavity half blocks in the closed condition of the mold fixture. This feature thus eliminates the need for rails 62, 64 and 66 and associated pins 114–122 and associated bushings and bushing rails. Fixture set-up time is thereby reduced and alignment accuracy is also enhanced by mounting the pins and bushings directly in the water manifold plate that also "nests" the associated half mold cavity block.

Fourthly, the mold cooling manifold plate is provided with a shallow recess in the front face, sealed by a peripheral O-ring, that is connected to a side ported venting passageway in-mold-labeling (IML) system for controlled negative pressure venting of the blow mold cavity of the half mold cavity part during blow molding. This feature cooperates with venting of the mold cavity to the backside of the half mold part for temporarily vacuum adhering a label in the mold cavity that is to be transferred in situ to the blown container during blow molding.

Figure 11:
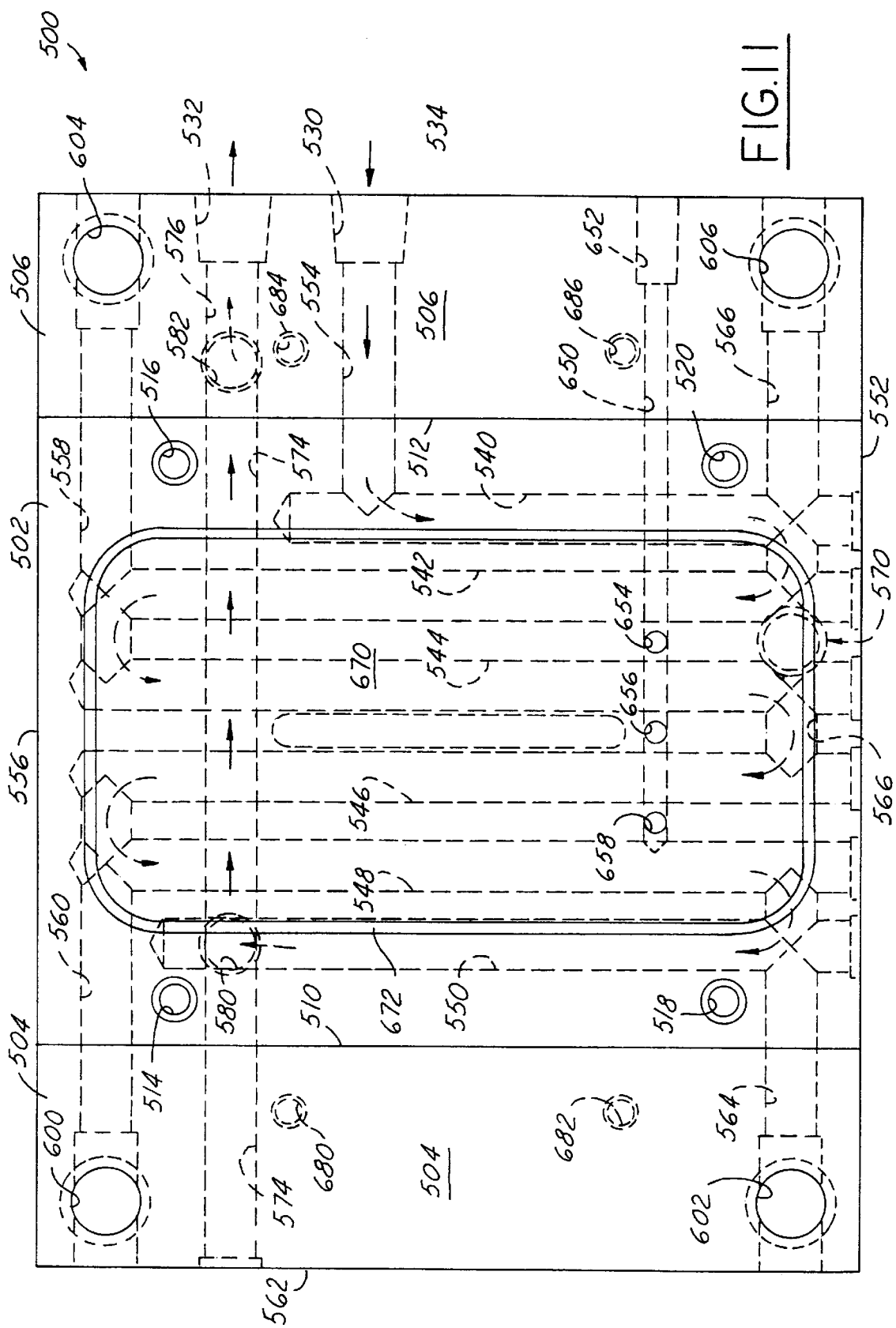
FIG. 11 is a front side elevational view of a third embodiment of the pin half of a cooling water manifold plate that is a component of a third embodiment of a mold nest fixture assembly (not shown).

As to the water cooling feature, the cooling of the mold cavity in the associated mold cavity half block (not shown), after the blowing of the hot parison therein, is accomplished by providing a liquid coolant circulating passageway system that is entirely contained within the manifold plate 500 as a sealed system communicating with the inlet and outlet ports 530 and 532 (FIGS. 11 and 13) provided in the right hand exterior side face 534 of plate 500. The coolant system in plate 500 preferably comprises six vertical coolant conducting passageways 540, 542, 544, 546, 548 and 550 arrayed parallel with one another and internally adjacent most of the area of the recessed front face 502 of plate 500 (FIG. 11). Each of these passageways is preferably formed by drilling a blind bore upwardly from the bottom face 552 of plate 500. The upper blind end of passageway 540 terminates just above a horizontal drilled blind bore coolant inlet supply passageway 554 (FIG. 11) extending coaxially with inlet port 530 and intersecting at its inner end the vertical passageway 540. The four middle vertical passageways 542, 544, 546 and 548 are all equal length and terminate at their upper blind ends just below of the top face 556 of block plate 500.

The upper ends of passageways 542 and 544 are interconnected by drilling a blind bore 558 into end face 534 that intersects the upper ends of passageways 542 and 544 and terminates in passageway 544. Likewise, the upper ends of passageways 546 and 548 are interconnected by drilling a blind horizontal bore 560 into the opposite end face 562 of plate 500 so as to intersect the upper ends of passageways 548 and 546 and terminate in passageway 546 (FIG. 11). The lower ends of passageways 548 and 550 are interconnected by drilling another blind bore 564 into end face 562 so as to coaxially and perpendicularly intersect the lower ends of passageways 550 and 548 and terminate in passage 548. Finally, still another blind bore 566 is drilled into side face 534 coaxially with passageways 540, 542, 544 and 546 adjacent the bottom face 552 of the block so as to intersect all four of these passageways and to terminate in passageway 546. Bore 566 intersects passageways 540 and 542 adjacent their lower ends thus interconnects these two passageways. However, fluid communication between lower ends of passageways 542 and 544 is blocked by inserting a cylindrical aluminum baffle 570 (FIG. 11) into a blind horizontal bore 572 that is drilled into the back face 508 of plate 500 (FIGS. 12 and 15) to perpendicularly intersect the axis of passageway 544 and overlap the adjacent passageways 542 and 544 (FIG. 11).

Figure 12:
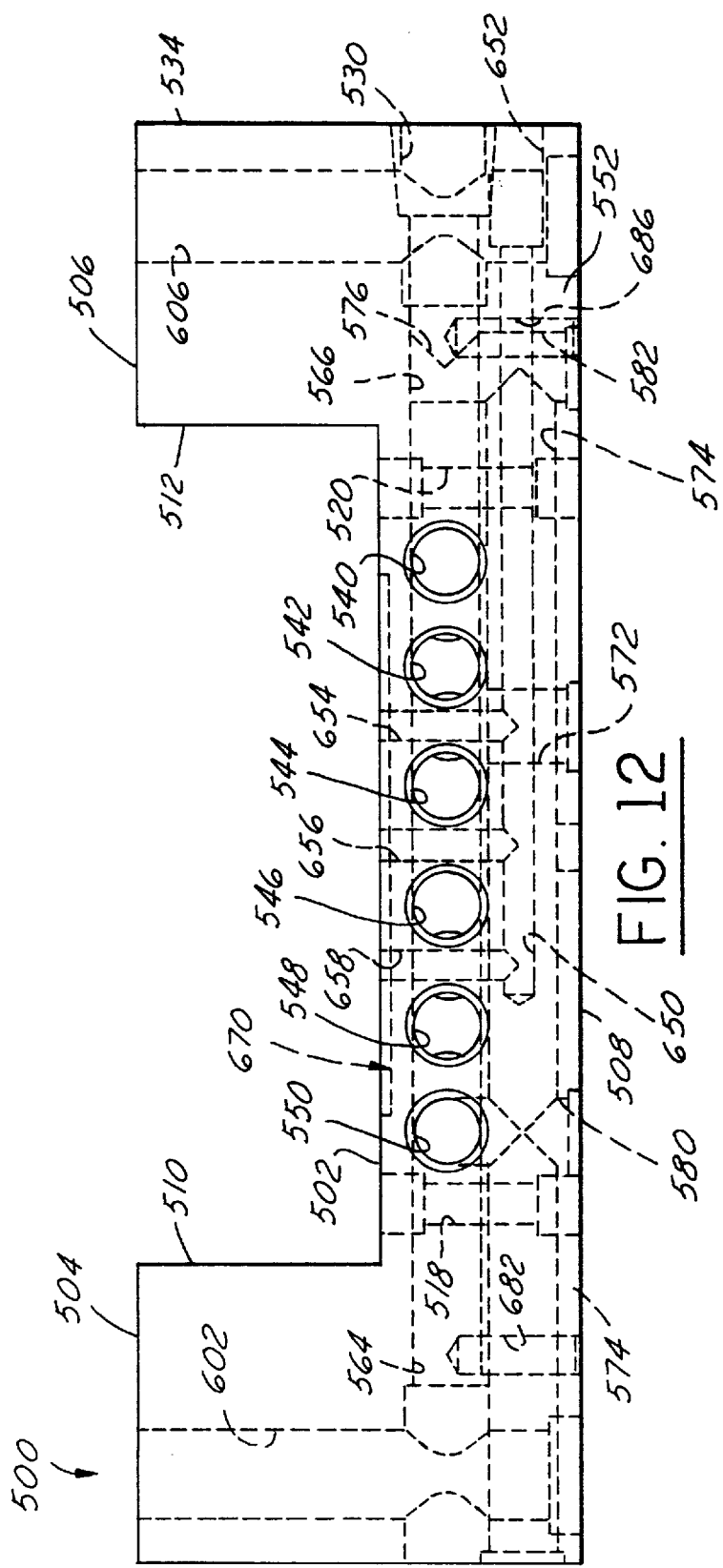
FIG. 12 is a bottom plan view of the manifold plate of FIG. 11.
Figure 13:
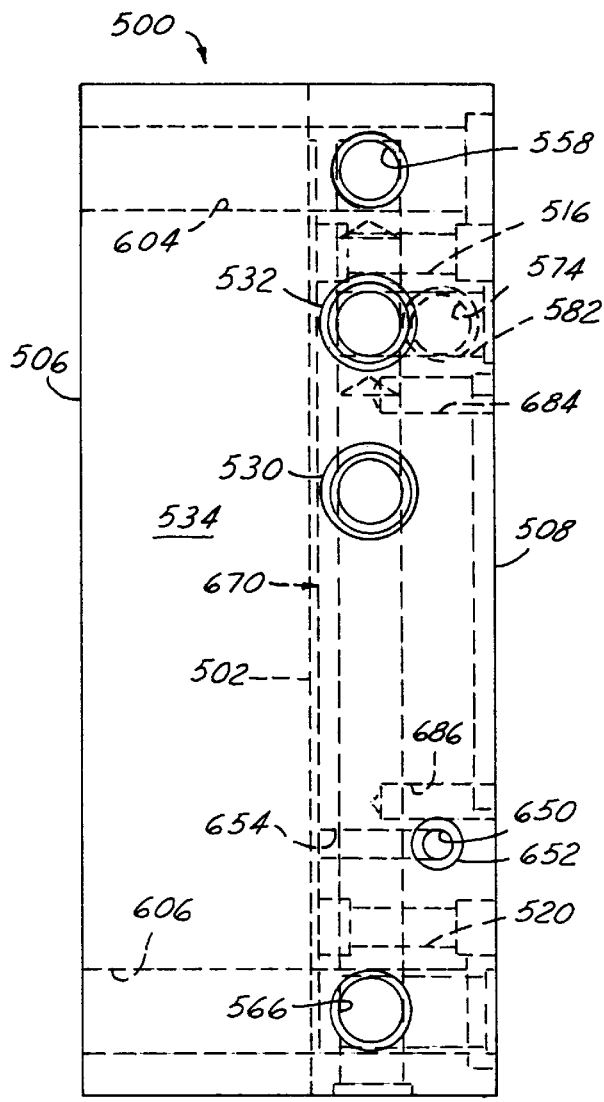
FIG. 13 is an elevational view of the right hand side of the manifold plate of FIG. 11 as viewed therein.
Figure 15:
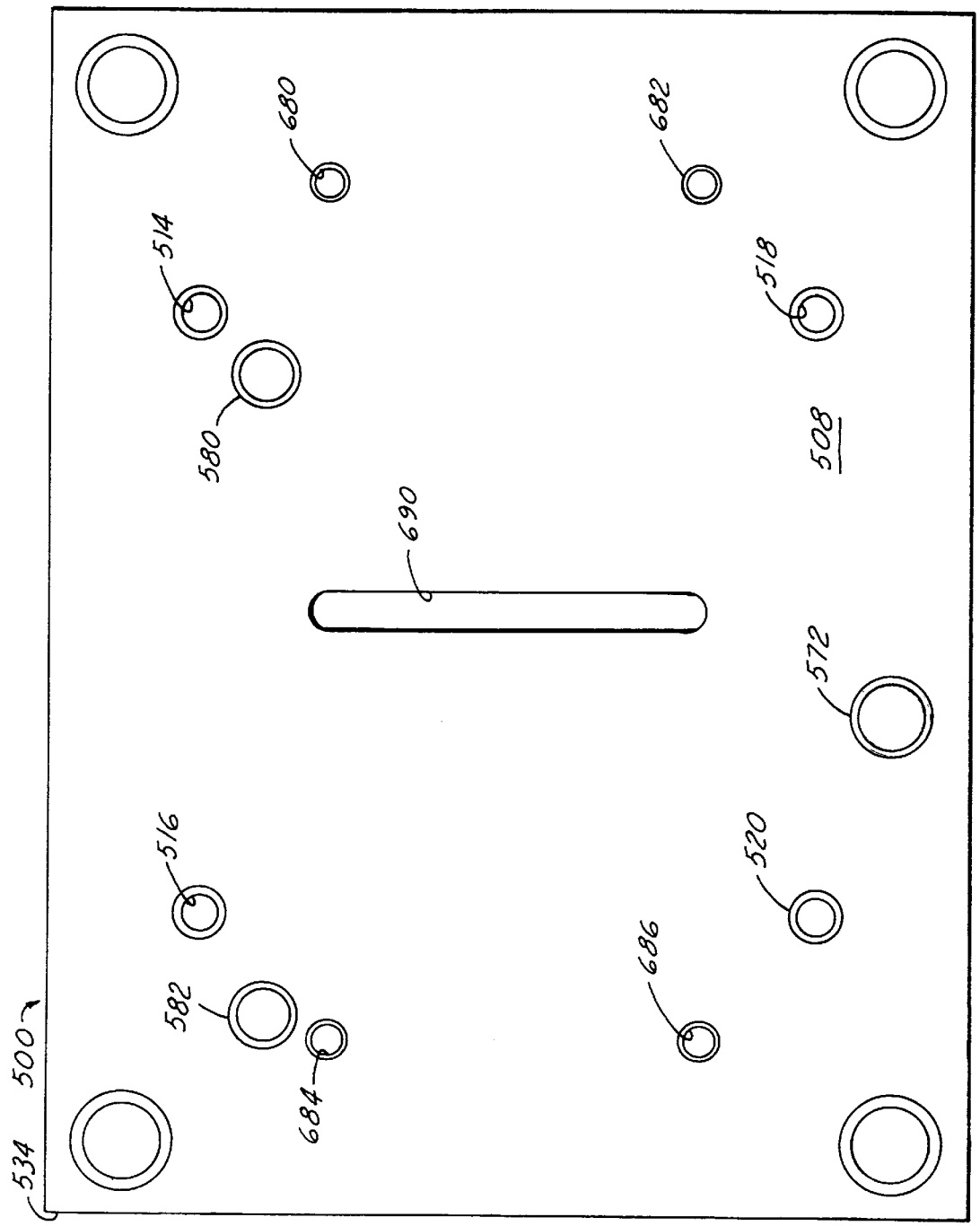
FIG. 15 is a rear side elevational view of the manifold plate of FIG. 11.

In order to provide an internal coolant return passageway from the upper end of downstream vertical passageway 550, another long blind end bore passageway 574 is drilled horizontally into left hand side face 562, extends horizontally internally of block 500 below tapped mounting holes 514, 516 and terminates adjacent but offset rearwardly from outlet port 532. A short blind bore passageway 576 is drilled perpendicular to the axis of outlet 532 and terminates below and to the right of tapped hole 516 (FIG. 11). A pair of short horizontal blind bore connector passageways 580 and 582 are drilled into the back face 508 of block 500 (FIGS. 11, 12 and 15). Blind bore connector 580 intersects the upper end of vertical passageway 550 as well as passageway 574 to thereby flow connect these passageways 550. Blind bore connector 582 intersects passage 574 as well as outlet passage 576 to thereby connect the downstream end of passage 574 with the short outlet passage 576 leading into outlet port 532 (FIGS. 11–13). The entrance of the drilled blind bore passageways 540–550, 572, 574, 580 and 582 are each individually sealed by an associated welch seal disk plug seated in an entranceway counterbore.

Figure 14:
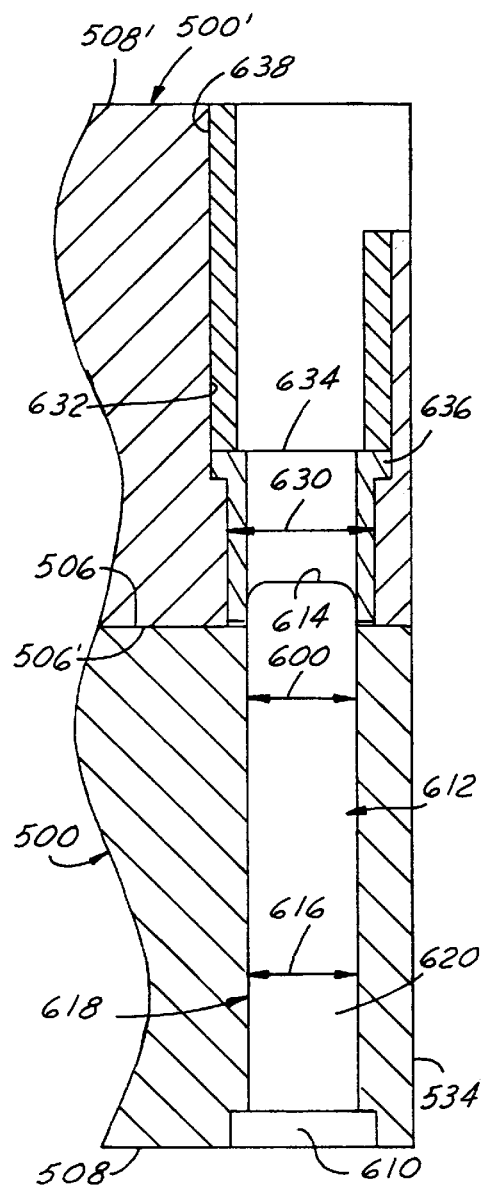
FIG. 14 is a fragmentary cross-sectional view illustrating the alignment pin and bushing parts interengaged upon closure together of the pin half and bushing half manifold plates of the third embodiment cooling water manifold plates carried in two cooperative mold nest fixtures.

Manifold cooling plate 500 also serves as the alignment fixture for aligning the cooperative mold cavity half blocks, that are mounted face-to-face in the associated recessed pockets of the water manifolds, upon mold closure by the mold fixture. For this purpose, four alignment pin throughbores 600, 602, 604 and 606 are drilled horizontally through block 500, one in each of its four comers, so as to extend between rear face 508 and front faces 504 and 506. The axes of pin bores 600 and 604 perpendicularly intersect the axes of passages 560 and 558, respectively, and the axes of pin bores 602 and 606 similarly intersect the axes of passages 564 and 566, respectively. Each of the pin bores 600, 606 is provided with a coaxial counterbore at face 508 for receiving the head 610 (FIG. 14) of an associated alignment pin 612 that is inserted in the associated pin bore 600–606 so as to protrude at its shrank free end 614 a predetermined distance (e.g., 0.312 inches) beyond the associated end faces 504, 506 of plate 500, as shown in FIG. 14 with reference to pin 612. A slightly larger diameter counterbore 616 (FIG. 14) is formed in bore 600 extending from the pin head countersink in rear face 508 and onward through the intersection of bore 600 with passageway 558. The resultant clearance space 618 formed between the pin shank 620 and counterbore 616 shortens the axial length of the interference retention fit of pin 620 in pin bore 600. The same construction is provided with respect to the remaining three alignment pins (not shown) that are identical to pin 612 and respectively received in alignment bores 602, 604 and 606.

It will be understood that the mating water manifold plate 500' (FIG. 14) is constructed as the substantially identical mirror image to plate 500, but differs therefrom in that it serves as the bushing half manifold plate to thereby mount alignment bushings that cooperate with the alignment pins to assure that each of the half mold cavities are aligned upon mold closure. For this purpose, as shown in FIG. 14 only, manifold plate 500' is provided with a bushing bore 630 that coaxially registers with pin bore 600 upon mold closure and opens to a counterbore 632 that extends to the end face or back face 508' of plate 500'. Bore 630 receives an alignment bushing 634 having an external end flange 636 that seats on a shoulder at the junction of bores 630 and 632. A backup sleeve 638 is affixed in counterbore 632 that serves to secure bushing 634 seated in place. The same is true for the mirror image coolant passages in manifold plate 500' corresponding to passages 558, 560, 564 and 566 of plate 500 to thereby mount the alignment pins in plate 500. Although not shown, blind bore passageways 558, 560, 564 and 566 are countersunk at their entrance ends for individually receiving a welch plug seal at the ends of such passageways.

The aforementioned IML internal venting passageway system for the associated mold cavity half block nested in manifold plate 500 (and likewise as to the mating manifold plate 500') comprises a horizontally extending blind passageway 650 and pipe threaded counterbore port 652 opening into plate side face 534 (FIGS. 11 and 13). Three parallel passages 654, 656 and 658 (FIGS. 11, 12 and 13) extend from common passage 650 out into a lower central region of a venting surface 670 that may be flush with back face 502 or recessed a slight distance rearwardly from the back face 502 of the recess pocket of plate 500. Venting surface 670 is surrounded by a peripheral groove 672 that receives an O-ring seated therein and that protrudes therefrom slightly past flush relative to face 502. Hence, when the associated mold cavity half block is mounted by suitable cap screws threaded in mounting openings 514–520 and drawn tight against face 502, the surface 670 is sealed off by the O-ring in groove 672 and thus provides a venting chamber that communicates with the venting port passageways 654–658 that in turn lead to the vent outlet port 652 in side 534. Thus, if the mold cavity half block is provided with the usual pin hole vents D (such as shown in conjunction with the prior art mold set-up of FIG. 2A described previously hereinabove) that open into the back face of the mold half, such pin hole vents will communicate with the chamber defined by the boundary of surface 670 and the surrounding O-ring in groove 672. This sealed venting system thus can serve as a relief for letting the air escape from the mold cavity as the parison is blow expanded therein. Alternatively or in combination therewith, a timed vacuum draw system can be coupled to port 652 to vacuum draw and thereby temporarily adhere a label to the mold cavity surface that will be transferred in situ to the blown container after expansion thereof as the positive blow pressure is communicated internally to the pinched parison tube. Alternatively, if desired, the IML passageway system can be used to achieve a more controlled expansion of the hot parison tube may thus be achieved by strategic placement of the pin hole vents coupled with a synchronized valve-controlled vacuum exhaust system that communicates with the pin hole vents.

Manifold plate 500 is suitably removably affixed to a backing plate or platen by suitable machine cap screws that thread into four tapped blind mounting holes 680, 682, 684 and 686 formed in the rear face 508 of plate 500 (FIGS. 11–13 and 15). In addition, a central, vertically extending keyway slot 690 is provided in the rear face 508 of plate 500 to receive key stock for alignment with an associated key and key slot of the mounting plate to which manifold plate 500 is fastened in the mold nest fixture assembly.

In view of the foregoing novel features of the third embodiment water manifold plate 500 that distinguish it from the previously described first and second embodiment water manifold plates 56 and 308, it is to be understood the water manifold plate 500 constitutes one of the presently preferred embodiments of the invention as illustrated herein.

Third Embodiment Mold Nest Fixture Assembly

Figure 17:
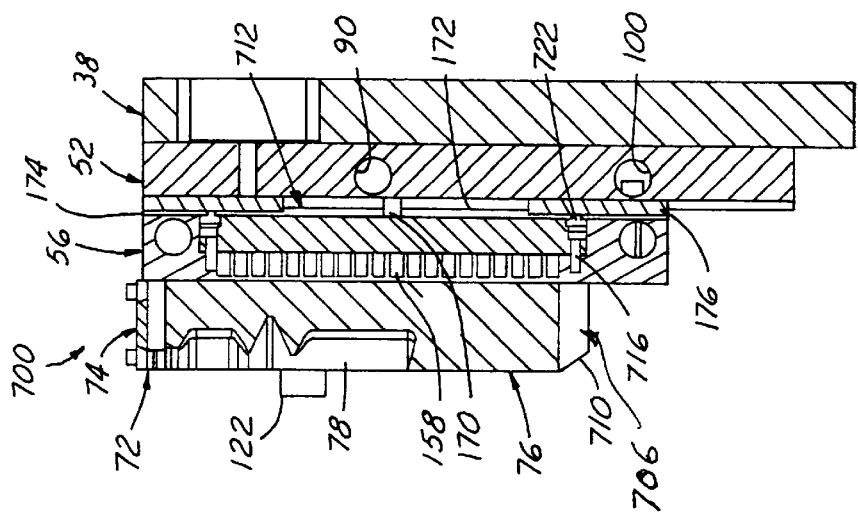
FIG. 17 is a vertical cross sectional view taken along the line 17—17 of FIG. 16.
Figure 16:
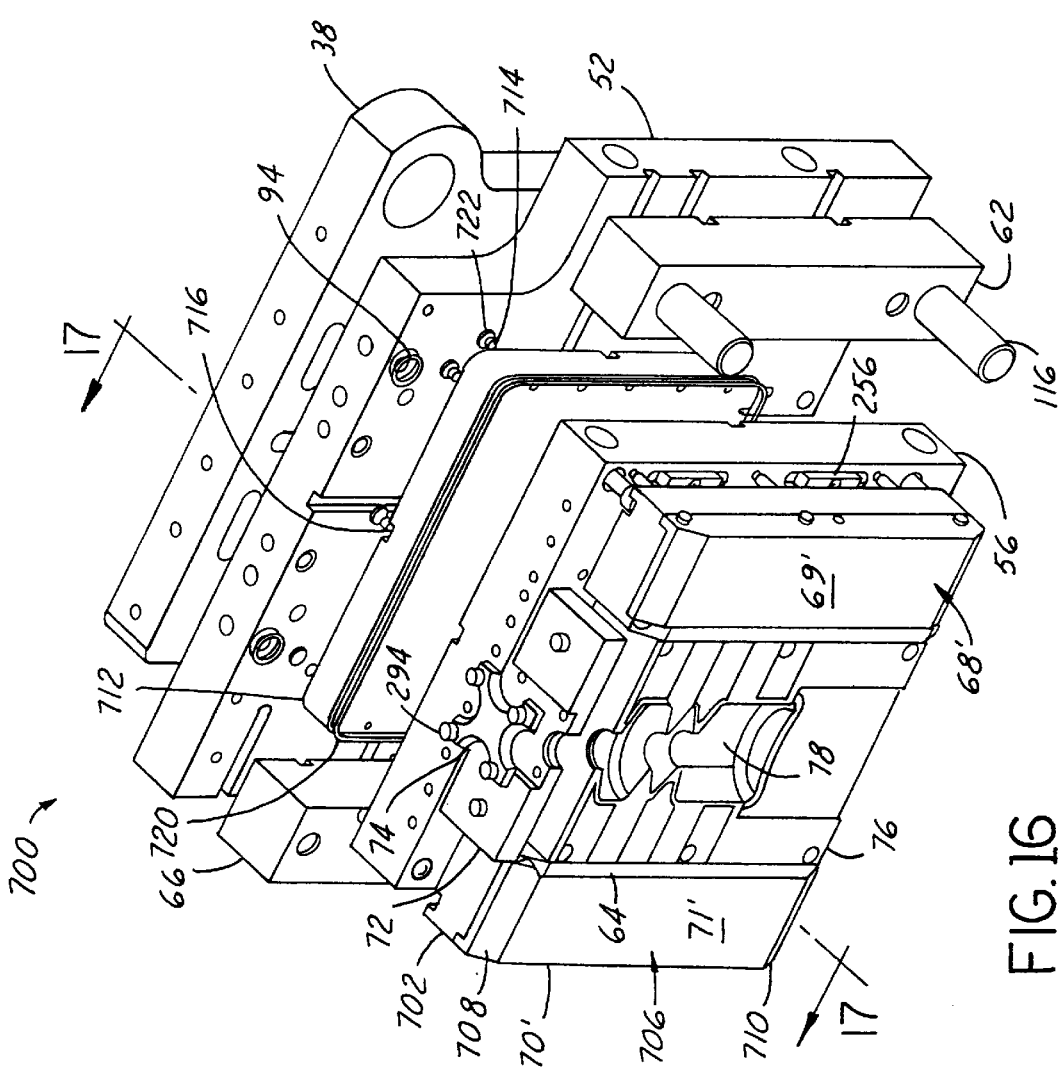
FIG. 16 is an exploded perspective view of a third embodiment of a mold nest fixture assembly of the invention which is similar to but a modification of the first embodiment fixture assembly of FIGS. 3–7.

FIGS. 16 and 17 illustrate a third embodiment of a mold nest fixture assembly of the invention which is similar the first embodiment fixture assembly of FIGS. 3–7, but modified with respect to the smasher plate portions and water manifold backing plate portion. Those components of the third embodiment fixture assembly 700 identical to components in fixture 50 of FIGS. 3–7 are given identical reference numerals and the description not repeated.

In comparing fixtures 50 and 700, it will be noted that bottom alignment rail 64 of fixture 50 and associated alignment pins 118, 120 have been eliminated from fixture 700 as not necessary to the proper tryout functioning of the mold nest fixture embodiment 50 or 700 of the invention.

Secondly, the combination smasher plate and mold standoff components 68 and 70, with their standoff and vent deflecting ribs 73 and 75, respectively, are modified in fixture 700 to provide modified smasher plate assemblies 68' and 70'. Referring to smasher plate assembly 70', it will be seen that the same is divided into a standoff abutment back member 702 removably fastened to manifold plate 56 and carrying the standoff abutment and vent deflecting rib 704 that corresponds to rib 75 of smasher plate 70. The front parison-smashing surface is formed by a separate smasher plate member 706 removably fastened to backing member 702. Plate 706 is provided with beveled surfaces 708 and 710 at its upper and lower edges to facilitate the parison smashing action during mold closure and reduce the possibility of parison hang-up as a result of the smashing action. The plate assembly 68' is constructed identically to assembly 70'.

As will be well understood by those skilled in the art, the mold nest fixture assemblies 50 and 700 are designed for use with a Mueller tri-nest system in which three parison tubes are simultaneously extruded from three parallel-oriented nozzles. The central one of such nozzles aligns with the mold cavity 78, and the outer two flanking parison tubes align with the smasher plates 68 and 70, or 68' and 70'. This feature of the prototype mold nest fixtures 50 and 700 is provided because it is more economical to run all three extruder nozzles even though using only a single cavity mold for prototype tryout purposes. The mutually opposed facing surfaces of the half mold nest assemblies, i.e., surface 69, 69' and its opposed surface of the other mold nest fixture, and surface 71, 71' and its opposed mating surface on the other mold nest fixture, are designed to be spaced a proper distance apart upon mold closure to the mold closure plane of these two fixtures to just squeeze the extruder parison flat. Hence a continuous flattened tube is formed by successive mold closures cycle and fed downwardly for retrieval as a continuous flattened length of scrap. This features eliminates the problems of cutoff of the unused flanking parison tubes, i.e., it avoids creating shavings and pieces that tend to clog the components of the molding machine as they fall by gravity.

A further modification found in fixture 700 versus fixture 50 is the change in water manifold cover plate 58 and water manifold support plate 60 of the cooling water manifold assembly 54. In fixture 700, the same water manifold plate 56 is utilized but components 58 and 60 are made as a one piece cover and support plate 712. Plate 712 is removably fastened to plate 56 by a series of 32 socket head cap screws 714 oriented in a peripheral array, and by centrally disposed cap screws 716 recessed into a keyway 172' extending centrally and vertically in the backside of plate 712 for receiving keys 174 and 176.

The liquid sealing feature is obtained by providing a Parker O-ring 720 (FIG. 16) constructed and arranged as a peripheral seal to replace the sealing weld 168 of fixture assembly 54. In addition, each of the socket head caps crews 714, 716 is backed up by a welch plug seal 722, as best seen in FIG. 17. The foregoing changes in the water manifold assembly 54 enable removal of the backing plate 712 when needed for cleaning the coolant passages 158 or for similar maintenance operations thereon.

Fourth Embodiment Mold Nest Fixture Assembly

Referring to FIGS. 18–23, a fourth embodiment of a mold nest fixture assembly 800 is illustrated that is also constructed in accordance with the principles of the present invention. Assembly 800 is similar to the second embodiment fixture assembly 300 of FIGS. 8–10 with the exception that: (1) the inlet and outlet coolant supply lines are connected to inlet and outlet ports 802 and 804 provided in the right hand side of a modified water cooling manifold plate 308' (shown in nest assembly in FIGS. 18–20 and by itself in FIGS. 21–23). Inlet port 802 connects via a horizontal through-passageway 803 to inlet passage 452' (FIGS. 21–23) and outlet port 804 connects via a horizontal through-passageway 805 to outlet passage 460' of the serpentine coolant passageway 440 of the manifold plate. The left-hand ends of passageways 803 and 805 are sealed by inserting suitable Welch seal plugs. By thus providing the coolant connections direct to the water cooling manifold plate 308', the cooling passageways 442, 444, 446, etc., provided in the backing plate 302 of fixture embodiment 300 can be eliminated to thereby simplify the backing plate 302' provided to cooperate with water manifold plate 308'.

To further simplify backing plate 302', the alignment and standoff rails 304 and 306 of fixture assembly 300 may be eliminated and alignment bushing pins mounted in two upper corner openings 810 and 812 of packing plate 302'. The standoff abutment function is then performed by the front face of the half mold cavity part 76' and its mirror image companion part in the other nest assembly fixture. Of course, backing plate 302' can be provided with the mounting keyways and with the standoff rails 304 and 306 and associated alignment pins and bushings and standoff rods, if desired, in the manner of fixture assembly 300 described previously.

Preferably the inner vertical edges 403 and 405 of the nest "wing" faces 402' and 404' are beveled faces. Manifold plate 308' is removably fastened to backing plate 302' by the four socket head cap screws 312, 314, etc., inserted in the four associated corner mounting holes 315, the same as in the case of plate 308.

We claim:

1. A method of producing a prototype mold for blow-molding hollow plastic containers, said method comprising the steps of:

(a) using computer-aided design to produce a geometric computer model of a container of desired contour, (b) using said computer container model to design and produce a software program for controlling a CNC machine to generate a mold cavity for producing the container of desired contour, (c) using the software control program in a CNC machine and thereby machining a plurality of mold portions made of heat conductive composition and that together have an inner surface complementary to the desired container contour such that said mold portions can be operably juxtaposed as two mold halves each having a front face that cooperates with the front face of the other mold half to form a mold cavity, and a back face and exterior contour of predetermined constant geometry, (d) providing for each said mold half an assembly of mold nest support components forming a support pocket contoured complemental to that of said predetermined constant geometry, (e) assembling each said mold half into the pocket of the associated assembly of mold nest support components, and wherein said method comprises the additional step of:

(f) providing a channel for cooling fluid in the pocket of each assembly of mold nest components for heat-dissipating contact with the back face of the associated mold half, wherein step (f) further comprises providing the cooling fluid channel in a manifold plate component of each nest component assembly against which the associated mold half is secured in flat face mutual abutment, and wherein the opposite vertical sides of each mold half are reinforced by mounting to the manifold plate component a pair of standoff blocks, one against each such half mold side, to thereby embrace the half mold laterally while also defining the opposite side walls of the associated pocket.

2. A method of producing a prototype mold for blow-molding hollow plastic containers, said method comprising the steps of:

(a) using computer-aided design to produce a geometric computer model of a container of desired contour, (b) using said computer container model to design and produce a software program for controlling a CNC machine to generate a mold cavity for producing the container of desired contour, (c) using the software control program in a CNC machine and thereby machining a plurality of mold portions made of a heat conductive composition and that together have an inner surface complementary to the desired container contour such that said mold portions can be operably juxtaposed as two mold halves each having a front face that cooperates with the front face of the other mold half to form a mold cavity, and a back face and exterior contour of predetermined constant geometry, (d) providing for each said mold half an assembly of mold nest support components forming a support pocket contoured complemental to that of said predetermined constant geometry, (e) assembling each said mold half into the pocket of the associated assembly of mold nest support components, and wherein said method comprises the additional step of:

(f) providing a channel for cooling fluid in the pocket of each assembly of mold nest components for heat-dissipating contact with the back face of the associated mold half, wherein step (f) further comprises providing the cooling fluid channel in a manifold plate component of each nest component assembly against which the associated mold half is secured in flat face mutual abutment, and wherein a backing plate is provided as part of the mold nest support components and is adapted for mounting to a stock molding machine platen, and registering alignment of the mold halves in mold closed condition is provided by mounting alignment pins and cooperative alignment bushings mounted to said backing plate independently of the mold halves.

3. A prototype mold apparatus for blow-molding hollow plastic containers, said apparatus comprising:

a plurality of mold portions that together have an inner surface complementary to the desired container contour such that said mold portions can be operably juxtaposed as two mold halves each having a front face that cooperates with the front face of the other mold half to form a mold cavity, and a back face and exterior contour of predetermined constant geometry, an assembly of mold nest support components forming a support pocket contoured complemental to that of said predetermined constant geometry, each said mold half being assembled into the pocket of the associated one of said assembly of mold nest support components, and wherein said mold cavity in each mold half is generated using computer-aided design to produce a geometric computer model of a container of desired contour, said computer container model is then used to design and produce a software program for controlling a CNC machine to generate a mold cavity for producing the container of desired contour, and then employing the software control program in a CNC machine and thereby machining a plurality of mold portions, wherein said mold portions are made of heat conductive composition, wherein each said assembly includes a channel for cooling fluid in the pocket of each said assembly of mold nest components for heat dissipating contact with the back face of the associated mold half, wherein said nest support components include a cooling fluid manifold plate, wherein said cooling fluid channel is formed in said manifold plate component of each nest component assembly, the associated mold half being secured in flat face mutual heat-transfer abutment with said manifold plate component, and wherein said nest support components include a pair of standoff blocks, the opposite vertical sides of each mold half being reinforced by said pair of standoff blocks being mounted to said manifold plate component, one against each such half mold side, to thereby embrace the half mold laterally while also defining the opposite side walls of the associated pocket.

4. A prototype mold apparatus for blow-molding hollow plastic containers, said apparatus comprising:

a plurality of mold portions that together have an inner surface complementary to the desired container contour such that said mold portions can be operably juxtaposed as two mold halves each having a front face that cooperates with the front face of the other mold half to form a mold cavity, and a back face and exterior contour of predetermined constant geometry, an assembly of mold nest support components forming a support pocket contoured complemental to that of said predetermined constant geometry, each said mold half being assembled into the pocket of the associated one of said assembly of mold nest support components, and wherein said mold cavity in each mold half is generated using computer-aided design to produce a geometric computer model of a container of desired contour, said computer container model is then used to design and produce a software program for controlling a CNC machine to generate a mold cavity for producing the container of desired contour, and then employing the software control program in a CNC machine and thereby machining a plurality of mold portions, wherein said mold portions are made of heat conductive composition, wherein each said assembly includes a channel for cooling fluid in the pocket of each said assembly of mold nest components for heat dissipating contact with the back face of the associated mold half, wherein said nest support components include a cooling fluid manifold plate, wherein said cooling fluid channel is formed in said manifold plate component of each nest component assembly, the associated mold half being secured in flat face mutual heat-transfer abutment with said manifold plate component, and wherein said mold nest support components include a backing plate adapted for mounting to a stock molding machine platen, and said mold nest components further include alignment pins and individually cooperative alignment bushings mounted to said backing plate independently of said mold halves operable for registering alignment of the mold halves in mold closed condition.

5. A prototype mold apparatus for blow-molding hollow plastic containers, said apparatus comprising:

a plurality of mold portions that together have an inner surface complementary to the desired container contour such that said mold portions can be operably juxtaposed as two mold halves each having a front face that cooperates with the front face of the other mold half to form a mold cavity, and a back face and exterior contour of predetermined constant geometry, an assembly of mold nest support components including cooperative water manifolds each forming a support pocket contoured complemental to that of said predetermined constant geometry, each said mold half being assembled into the pocket of the associated one of said water manifolds, said mold portions being made of heat conductive composition, and wherein each of said water manifold has an internal channel for circulating cooling fluid adjacent the pocket of each said manifold for heat-dissipating heat transfer with the back face of the associated mold half, wherein each said water manifold comprises a cooling fluid manifold plate nest support component, and wherein said cooling fluid channel is formed solely in said manifold plate component of each nest component assembly, the associated mold half being secured in flat face mutual heat-transfer abutment in said pocket of said manifold plate component, wherein said cooling fluid channel comprises parallel vertically extending blind bores in said plate joined at alternate ends by horizontal blind bores in said plate, wherein said manifold plate has a venting fluid channel open at a peripherally sealed zone of the front area of said manifold plate pocket, wherein the back face of the associated mold half is vented and assembled as a vented closure cover for the open zone area of said venting fluid channel.

6. A prototype mold apparatus for blow-molding hollow plastic containers, said apparatus comprising:

a plurality of mold portions that together have an inner surface complementary to the desired container contour such that said mold portions can be operably juxtaposed as two mold halves each having a front face that cooperates with the front face of the other mold half to form a mold cavity, and a back face and exterior contour of predetermined constant geometry, an assembly of mold nest support components including cooperative water manifolds each forming a support pocket contoured complemental to that of said predetermined constant geometry, each said mold half being assembled into the pocket of the associated one of said water manifolds, said mold portions being made of heat conductive composition, and wherein each of said water manifold has an internal channel for circulating cooling fluid adjacent the pocket of each said manifold for heat-dissipating heat transfer with the back face of the associated mold half, wherein each said water manifold comprises a cooling fluid manifold plate nest support component, and wherein said cooling fluid channel is formed solely in said manifold plate component of each nest component assembly, the associated mold half being secured in flat face mutual heat-transfer abutment in said pocket of said manifold plate component, wherein said pocket of each said manifold plate component comprises a recess in the front face thereof with the recess defined by a pair of horizontally spaced side walls that closely flank and embrace the sides of the associated mold half to reinforce the same against horizontally directed stresses generated in the mold cavity during blow molding and further defined by a back wall with said cooling fluid channel adjacent thereto internally of said plate, and wherein each said manifold plate includes a pair of standoff block portions defining said flanking side walls of said pocket, the mutually opposed vertical facing surfaces for each mold cavity half being formed by said pair of standoff block portions oriented co-planar with the front face plane of the associated said mold half and located adjacent the proximate side of said half mold to thereby serve as a standoff mutual abutment in the mold closed condition.

7. The method of claim 1 wherein each standoff block is provided with a standoff rib having a face co-planar with the front face plane of the associated mold-half and located adjacent the proximate side of the half mold to thereby serve as an standoff abutment in the mold closed condition and as a face vent deflector plate.

8. The method of claim 2 wherein standoff abutment of the mold nest components is provided by mounting standoff abutment means on the mold nest component assemblies independently of the mold halves and positioned to mutually abut in the mold closed condition to define the mold closure plane.

9. The apparatus of claim 3 wherein each said standoff block has a standoff rib with a face co-planar with the front face plane of the associated said mold half and located adjacent the proximate side of said half mold to thereby serve as an standoff abutment in the mold closed condition and as a face vent deflector plate.

10. The apparatus of claim 4 wherein said mold nest components include standoff abutment means mounted on the mold nest component assemblies independently of the mold halves and positioned to mutually abut in the mold closed condition to define the mold closure plane.

11. The apparatus of claim 6 wherein said cooling manifold plates are adapted for mounting to a stock molding machine platen, and together further include alignment pins and cooperative alignment bushings mounted to said standoff block portions independently of said mold cavity halves and operable for causing registering alignment of the mold halves in the mold closed condition.

12. The apparatus of claim 11 wherein said pins and bushings are constructed and arranged to intersect associated ones of said horizontal blind bores in the portions thereof entering the associated manifold plate.

* * * * *